(12) United States Patent
Taguchi et al.

(10) Patent No.: US 9,033,679 B2
(45) Date of Patent: May 19, 2015

(54) DISPLACEMENT CONTROL SYSTEM FOR VARIABLE DISPLACEMENT COMPRESSOR

(75) Inventors: Yukihiko Taguchi, Maebashi (JP); Yoshihiro Ochiai, Tomioka (JP)

(73) Assignee: SANDEN CORPORATION, Gunma (JP)

( * ) Notice: Subject to any disclaimer, the term of this patent is extended or adjusted under 35 U.S.C. 154(b) by 795 days.

(21) Appl. No.: 12/526,258

(22) PCT Filed: Feb. 7, 2008

(86) PCT No.: PCT/JP2008/052050
§ 371 (c)(1),
(2), (4) Date: Aug. 6, 2009

(87) PCT Pub. No.: WO2008/096824
PCT Pub. Date: Aug. 14, 2008

(65) Prior Publication Data
US 2010/0260619 A1    Oct. 14, 2010

(30) Foreign Application Priority Data

Feb. 9, 2007 (JP) ................................. 2007-030479
Apr. 2, 2007 (JP) ................................. 2007-096187
Jun. 4, 2007 (JP) ................................. 2007-147971

(51) Int. Cl.
*F04B 27/08* (2006.01)
*F04B 1/26* (2006.01)
(Continued)

(52) U.S. Cl.
CPC ............ *F25B 49/022* (2013.01); *B60H 1/3216* (2013.01); *B60H 1/322* (2013.01); *B60H 2001/325* (2013.01); *B60H 2001/3263* (2013.01); *B60H 2001/3266* (2013.01); *B60H 2001/3275* (2013.01); *F04B 27/1804* (2013.01); *F04B 2027/1818* (2013.01); *F04B 2027/185* (2013.01); *F04B 2027/1854* (2013.01); *F25B 9/008* (2013.01); *F25B 2309/061* (2013.01); *F25B 2600/023* (2013.01); *F25B 2700/02* (2013.01); *F25B 2700/15* (2013.01); *F25B 2700/1931* (2013.01); *F25B 2700/2106* (2013.01); *F25B 2700/21172* (2013.01); *F25B 2700/21173* (2013.01)

(58) Field of Classification Search
USPC .............. 417/222.2, 270, 272; 62/226, 228.1, 62/228.3, 229
See application file for complete search history.

(56) References Cited

U.S. PATENT DOCUMENTS 4,723,416 A * 2/1988 Suzuki ........................... 62/226
6,196,808 B1 * 3/2001 Taguchi ..................... 417/222.2
(Continued)

FOREIGN PATENT DOCUMENTS

EP    1 308 329    5/2003
EP    1 528 338    5/2005
(Continued)

*Primary Examiner* — Charles Freay
*Assistant Examiner* — Lilya Pekarskaya
(74) *Attorney, Agent, or Firm* — Cozen O'Connor

(57) ABSTRACT

A displacement control system (A) of a variable displacement compressor sets a target for pressure in an intake chamber or a crank chamber, on the basis of a detected evaporator-outlet air temperature and a target for evaporator-outlet air temperature. The pressure of a refrigerant in a high-pressure section is detected, and a regulating current is supplied to a solenoid (316) of a displacement control valve, on the basis of the pressure of the refrigerant in the high-pressure section and the target for pressure.

30 Claims, 19 Drawing Sheets

(51) Int. Cl.
  *F04B 1/00*    (2006.01)
  *F04B 27/00*   (2006.01)
  *F04B 49/00*   (2006.01)
  *F25B 49/02*   (2006.01)
  *B60H 1/32*    (2006.01)
  *F04B 27/18*   (2006.01)
  *F25B 9/00*    (2006.01)

(56) References Cited

U.S. PATENT DOCUMENTS

| | | | |
|---|---|---|---|
| 6,615,600 B2* | 9/2003 | Shi et al. | 62/228.3 |
| 6,644,054 B1* | 11/2003 | Kettner et al. | 62/228.3 |
| 6,694,764 B1* | 2/2004 | Eckstein et al. | 62/228.3 |
| 7,243,502 B2* | 7/2007 | Umemura et al. | 62/228.3 |
| 7,273,356 B2* | 9/2007 | Ochiai | 417/222.2 |
| 2002/0001524 A1* | 1/2002 | Fujii et al. | 417/222.2 |
| 2002/0094278 A1* | 7/2002 | Fukanuma et al. | 417/222.2 |
| 2003/0018415 A1* | 1/2003 | Sonobe et al. | 700/275 |
| 2003/0044290 A1* | 3/2003 | Yokomachi et al. | 417/222.2 |
| 2003/0094008 A1* | 5/2003 | Yoshida et al. | 62/228.3 |
| 2004/0003603 A1* | 1/2004 | Saeki et al. | 62/133 |
| 2004/0089004 A1* | 5/2004 | Ogiso et al. | 62/203 |
| 2004/0191077 A1* | 9/2004 | Ochiai | 417/222.2 |
| 2005/0034469 A1* | 2/2005 | Ochiai | 62/239 |
| 2005/0066676 A1* | 3/2005 | Ochiai | 62/228.3 |
| 2005/0123409 A1* | 6/2005 | Ota et al. | 417/222.2 |
| 2006/0130499 A1* | 6/2006 | Hong et al. | 62/176.6 |
| 2006/0185375 A1* | 8/2006 | Nadamoto et al. | 62/228.1 |
| 2006/0242976 A1* | 11/2006 | Nakamura | 62/228.1 |
| 2006/0275145 A1* | 12/2006 | Takahashi et al. | 417/222.2 |
| 2007/0079621 A1* | 4/2007 | Lee et al. | 62/228.4 |
| 2007/0084596 A1* | 4/2007 | Umehara | 165/202 |
| 2010/0161134 A1* | 6/2010 | Takahashi | 700/276 |
| 2010/0175401 A1* | 7/2010 | Taguchi et al. | 62/228.3 |
| 2011/0076161 A1* | 3/2011 | Taguchi | 417/213 |
| 2011/0182753 A1* | 7/2011 | Taguchi | 417/222.1 |
| 2011/0219797 A1* | 9/2011 | Taguchi | 62/129 |
| 2011/0229348 A1* | 9/2011 | Honda | 417/270 |

FOREIGN PATENT DOCUMENTS

| | | |
|---|---|---|
| JP | 09-268973 | 10/1997 |
| JP | 11-107929 | 4/1999 |
| JP | 2001-107845 | 4/2001 |
| JP | 2001-132650 | 5/2001 |
| JP | 2002-147350 | 5/2002 |
| JP | 2005-180328 | 7/2005 |
| JP | 2005-225439 | 8/2005 |
| JP | 2006-22768 | 1/2006 |
| JP | 2006-266172 | 10/2006 |
| JP | 2006-329050 | 12/2006 |

* cited by examiner

FIG. 9

TARGET TORQUE SET IN IDLING MODE

TARGET TORQUE SET IN ACCELERATION MODE

DISPLACEMENT CONTROL SYSTEM FOR VARIABLE DISPLACEMENT COMPRESSOR

TECHNICAL FIELD

This invention relates to a displacement control system of a variable displacement compressor applied to an air conditioning system.

BACKGROUND ART

A variable displacement reciprocating compressor used in an automotive air conditioning system, for example, has a housing, and inside the housing, a discharge chamber, an intake chamber, a crank chamber and cylinder bores are defined. On a drive shaft extending inside the crank chamber, a swash plate is mounted to be variable in inclination, and a conversion mechanism including the swash plate converts rotation of the drive shaft into reciprocating motion of pistons fitted within the respective cylinder bores. By the reciprocating motion, each piston performs a discharge process of drawing an operating fluid from the intake chamber into its own cylinder bore, compressing the drawn-in operating fluid and discharging the compressed operating fluid to the discharge chamber.

The stroke of the piston, therefore, the displacement, or amount of the operating fluid discharged per reciprocation is varied by varying pressure in the crank chamber (control pressure). In order to control the displacement, a displacement control valve is arranged in a gas supply passage connecting the discharge chamber and the crank chamber, and a constriction is provided in a gas release passage connecting the crank chamber and the intake chamber.

The displacement control valve is controlled by a control device. For example, a control device disclosed in Japanese Patent Application KOKAI Publication 2001-132650 (Patent Document 1) performs feedback control of displacement in a manner causing a pressure difference (differential pressure) between pressure in the discharge chamber (discharge pressure) and pressure in the intake chamber (intake pressure) to approach a target. Specifically, the control device of Patent Document 1 controls the pressure difference by varying current supplied to the displacement control valve, as a result of which, the displacement varies. For example, the operation of the control device decreasing the differential pressure to maintain it at a specified value results in an increase in displacement.

Japanese Patent Application KOKAI Publication Hei 9-268973 (Patent Document 2) and Japanese Patent Application KOKAI Publication Hei 11-107929 (Patent Document 3) each discloses a displacement control valve with a pressure sensing member incorporated therein, where the displacement is feedback-controlled on the basis of the intake pressure sensed by the pressure sensing member. The pressure sensing member consists of, for example a bellows, which expands to increase the flow passage area in the gas supply passage to decrease the displacement, when the intake pressure decreases.

However, for example when the refrigerant quantity is insufficient in the automotive air conditioning system, the displacement control on the variable displacement compressor by the control device disclosed in Patent Document 1 results in a smaller differential pressure between the discharge chamber and the intake chamber, compared with when the refrigerant quantity is adequate.

In such case, in order to cause the differential pressure to approach the target, the control device of Patent Document 1 operates to increase the displacement. Thus, when the refrigerant quantity is insufficient, operating the variable displacement compressor by feedback-controlling the differential pressure results in accelerated increase of the displacement, since the differential pressure does not reach the target. Eventually, the compressor continues operating with the maximum displacement, which may lead to breakage of the compressor.

Even in such case, if feedback control of displacement is performed by sensing the intake pressure by the pressure sensing member, as in Patent documents 2 and 3, the risk of the compressor breakage reduces. This is because when the insufficient refrigerant quantity causes decrease of the intake pressure, the displacement is decreased in order to maintain the intake pressure at a specified value, where the displacement is decreased finally to its minimum. In this sense, the feedback control of displacement by sensing the intake pressure includes a fail safe function.

The feedback control described in Patent Documents 2 and 3, however, requires that the displacement control valve include a sensing member for sensing the intake pressure. Specifically, the sensing member includes a bellows, a diaphragm or the like defining a closed space variable in volume and being vacuum or at atmospheric pressure. The use of such sensing member leads to complex structure of the displacement control valve.

Further, when heat load on the refrigeration cycle of the air conditioning system is great and revolving speed of the compressor is low, control of the intake pressure using the displacement control valve including a pressure sensing member may not produce a sufficient decrease of the displacement. In such case, actual intake pressure may exceed the range of control, resulting in complete loss of control over displacement. The loss of control over displacement requires stop of the compressor, which damages the conditioned state of air in the vehicle interior.

For example, driving the variable displacement compressor is a great load for the engine of the vehicle. Thus, there is taken a measure such that while the vehicle is accelerating or moving up a slope, for example, the displacement is temporarily decreased to decrease the compressor driving load. This is to apply as much engine power as possible to the vehicle's running, while maintaining a certain level of air conditioning performance. In such case, however, a great heat load leads to loss of control over intake pressure, which requires stop of the compressor, thus greatly damaging the conditioned state of air in the vehicle interior.

Further, in order to protect the compressor and the air conditioning system, there is taken a measure such that a discharge pressure sensor detecting the pressure of a refrigerant is provided in the high-pressure side of the refrigeration cycle to perform control causing decrease of the displacement when the pressure detected by the discharge pressure sensor exceeds a set threshold. However, the discharge pressure exceeding the threshold may entail an intake pressure exceeding the controllable upper limit. In such case, the compressor needs to be stopped, which greatly damages the conditioned state of air in the vehicle interior.

These problems are connected with the fact that the maximum intake pressure controllable by the displacement control valve including the bellows is low. Specifically, FIG. 2 of Patent Document 3 shows a relationship between pressure in the intake chamber and current supplied to the solenoid, where the refrigerant is R134a. The controllable upper limit of intake pressure is between 0.3 and 0.4 MPa. In order to make the displacement control practicable even with a great heat load, it is necessary to raise this controllable upper limit, thereby widening the range of control of intake pressure to a great extent.

The range of control of intake pressure can be widened by increasing the electromagnetic force generated by the solenoid. The significant widening of the range of control however entails an increase in size of the solenoid, which is undesirable in view of design rationality.

Another conceivable means of widening the range of control is forming the bellows with a reduced size so that the bellows has a pressure-sensing surface sensing the intake pressure, reduced in area (effective area). The reduction in size of the bellows is however restricted by the necessity to provide a coil spring and a stopper restricting the expansion and contraction of the bellows, inside the bellows vacuum or at atmospheric pressure.

Further, when a diaphragm is used to sense the intake pressure in place of the bellows, reduction in area of a pressure-sensing surface of the diaphragm entails reduction in displacement of the diaphragm, thus reduction in stroke of the valve, in order to ensure sufficient life of the diaphragm. The reduction in size of the diaphragm is therefore restricted by this requirement.

Further, in the air conditioning system using carbon dioxide as a refrigerant, the refrigerant pressure becomes very high, which makes it difficult to feedback-control the displacement by sensing the intake pressure by means of a pressure-sensing member such as a bellows.

Further, it is demanded that in the vehicle's idling, the load on the variable displacement compressor be regulated to allow stable control of the engine revolving speed. So far, such regulation has not been achieved by the displacement control method controlling the intake pressure.

DISCLOSURE OF THE INVENTION

An object of the present invention is to provide a displacement control system of a variable displacement compressor controlling the intake pressure, simple in structure and greatly widened in control range.

Another object of the present invention is to provide a displacement control system of a variable displacement compressor controlling the intake pressure or the control pressure, and having a plurality of setting modes.

A further object of the present invention is to provide a displacement control system of a variable displacement compressor capable of selecting from a plurality of setting modes depending on operating conditions of an air conditioning system and/or a vehicle or the like to which the air conditioning system is applied, to perform displacement control in an optimum manner for the operating conditions.

In order to achieve the above objects, the present invention provides a displacement control system of a variable displacement compressor provided in a circulation line along which a refrigerant circulates, together with a radiator, an expansion device and an evaporator to constitute a refrigeration cycle of an air conditioning system, and designed such that variation in control pressure causes variation in displacement, comprising a displacement control valve including a valve body capable of opening and closing a valve hole by receiving high-pressure, at least either of low-pressure and said control pressure, and electromagnetic force generated by a solenoid, where the high-pressure is the pressure of the refrigerant at a location in a high-pressure section of the refrigeration cycle and the low-pressure is the pressure of the refrigerant at a location in a low-pressure section of the refrigeration cycle, the displacement control valve being capable of regulating the displacement of the variable displacement compressor by varying said control pressure by opening and closing the valve hole; a high-pressure detection means detecting said high-pressure; an external information detection means detecting external information about the refrigeration cycle; a target pressure setting means setting a target for said low-pressure or said control pressure on the basis of the external information detected by said external information detection means; and a current regulation means capable of regulating current supplied to the solenoid of the displacement control valve in one or more regulation modes, where in a first regulation mode, the current regulation means regulates the current supplied to the solenoid of the displacement control valve, on the basis of the high-pressure detected by the high-pressure detection means and the target for pressure set by the target pressure setting means.

It is desirable that the current regulation means regulate the current supplied to the solenoid of the displacement control valve, on the basis of a difference between the high-pressure detected by the high-pressure detection means and the target for pressure set by the target pressure setting means.

It is desirable that the high-pressure section be a section from a discharge chamber of the variable displacement compressor to the expansion device, and that the low-pressure section be a section from the expansion device to an intake chamber of the variable displacement compressor.

It is desirable that the high-pressure detection means include a pressure detection means detecting the pressure of the refrigerant at a location in the high-pressure section.

It is desirable that the high-pressure detection means include a temperature detection means detecting the temperature of the refrigerant at a location in the high-pressure section.

It is desirable that the high-pressure detection means directly or indirectly detect the pressure of the refrigerant in the discharge chamber of the variable displacement compressor as said high-pressure, and that the target for pressure set by the target pressure setting means be a target for the pressure of the refrigerant in the intake chamber of the variable displacement compressor.

It is desirable that the target pressure setting means be capable of setting the target for pressure in one or more setting modes, where said one or more setting modes include a first setting mode designed to set a target for temperature of air immediately after passing across the evaporator, and set said target for pressure to cause the temperature of air immediately after passing across the evaporator to approach said target for temperature.

It is desirable that the external information detection means include an evaporator-outlet air temperature detection means measuring the temperature of air immediately after passing across the evaporator, and that in said first setting mode, the target pressure setting means set said target for pressure to cause the temperature of air immediately after passing across the evaporator, detected by said evaporator-outlet air temperature detection means to approach said target for temperature.

It is desirable that the external information detection means include a heat load detection means detecting heat load on the refrigeration cycle, and that in said first setting mode, the target pressure setting means set said target for pressure, on the basis of the heat load detected by the heat load detection means, to cause the temperature of air immediately after passing across the evaporator to approach said target for temperature.

It is desirable that the air conditioning system be applied to a vehicle, that the external information detection means include a heat load detection means detecting heat load on the refrigeration cycle, and an operating condition detection means detecting operating conditions of at least either of the variable displacement compressor and the vehicle, and that in said first setting mode, the target pressure setting means set said target for pressure, on the basis of the heat load on the refrigeration cycle detected by the heat load detection means and the operating conditions of at least either of the variable displacement compressor and the vehicle detected by the operating condition detection means.

It is desirable that said one or more setting modes further include a second setting mode designed to set a target for variable-displacement-compressor driving load, and set said target for pressure to cause the variable-displacement-compressor driving load to approach said target for driving load.

It is desirable that said one or more setting modes further include a third setting mode designed to set a target for said high-pressure, and set said target for pressure to cause the high-pressure detected by the high-pressure detection means to approach said target for high-pressure.

It is desirable that when the high-pressure detected by the high-pressure detection means exceeds an upper limit, the target pressure setting means take the third setting mode, giving it priority over the first and second setting modes.

It is desirable that a driving load calculation means calculating the variable-displacement-compressor driving load be further provided, and that in said second setting mode, the target pressure setting means set said target for pressure to cause the driving load calculated by the driving load calculation means to approach the target for driving load.

It is desirable that the driving load calculation means calculate the variable-displacement-compressor driving load on the basis of a difference between said high-pressure and said low-pressure or a difference between said high-pressure and said control pressure or a physical quantity correlating with one of these differences.

It is desirable that the driving load calculation means calculate the variable-displacement-compressor driving load on the basis of the current supplied to the solenoid as said physical quantity.

It is desirable that the target pressure setting means take the second setting mode, when any of one or more execution conditions is met, where one of said one or more execution conditions is that the air conditioning system is switched on.

It is desirable that the second setting mode be maintained for a predetermined period of time after the target pressure setting means takes the second setting mode.

It is desirable that the air conditioning system be applied to a vehicle, and that the target pressure setting means take the second setting mode, when any of one or more execution conditions is met, where one of said one or more execution conditions includes a limitation relating to the operating conditions of the vehicle.

It is desirable that one of said one or more execution conditions be that the vehicle is in an idling state.

It is desirable that one of said one or more execution conditions include a limitation that at least either of throttle opening degree and engine revolving speed is greater than or equal to a predetermined value.

It is desirable that the target pressure setting means take the second setting mode, when any of one or more execution conditions is met, where one of said one or more execution conditions includes a limitation that the heat load on the refrigeration cycle is greater than or equal to a predetermined value.

It is desirable that the target pressure setting means take the second setting mode, when any of one or more execution conditions is met, where one of said one or more execution conditions includes a limitation that at least either of throttle opening degree and engine revolving speed exceeds a predetermined value and the heat load on the refrigeration cycle is greater than or equal to a predetermined value.

It is desirable that one of said one or more execution conditions include a limitation that the current now being supplied to the solenoid in the first setting mode is greater than the current estimated to be supplied to the solenoid in the second setting mode.

It is desirable that the current regulation means store the target for pressure immediately before a shift from the first setting mode to the second setting mode, and when a shift from the second setting mode back to the first setting mode takes place, regulate the current supplied to the solenoid on the basis of the stored target for pressure.

It is desirable that the target pressure setting means be capable of setting the target for pressure in one or more setting modes, where said one or more setting modes include a second setting mode designed to set a target for variable-displacement-compressor driving load, and set said target for pressure to cause the variable-displacement-compressor driving load to approach said target for driving load.

It is desirable that the target pressure setting means be capable of setting the target for pressure in one or more setting modes, where said one or more setting modes include a third setting mode designed to set a target for said high-pressure, and set said target for pressure to cause the high-pressure detected by the high-pressure detection means to approach said target for high-pressure.

It is desirable that the variable displacement compressor include a housing with a discharge chamber, a crank chamber, an intake chamber and cylinder bores defined inside, pistons fitted in the respective cylinder bores, a drive shaft rotatably supported inside the housing, a conversion mechanism including a swash plate variable in inclination and converting rotation of the drive shaft into reciprocating motion of the pistons, a gas supply passage connecting the discharge chamber and the crank chamber, and a gas release passage connecting the crank chamber and the intake chamber, wherein the displacement control valve be incorporated in either of the gas supply passage and the gas release passage.

It is desirable that the target pressure setting means set said target for pressure between preset upper and lower limits.

It is desirable that said upper and lower limits be varied on the basis of external information detected by the external information detection means.

It is desirable that when the high-pressure detected by the high-pressure detection means exceeds a preset upper limit for the high-pressure, said current regulation means take a second regulation mode, giving it priority over said first regulation mode, and in the second regulation mode, set a target for the high-pressure and regulate the current supplied to the solenoid to cause the high-pressure detected by the high-pressure detection means to approach said target for high-pressure.

It is desirable that the refrigerant be carbon dioxide.

In the displacement control system of the variable displacement compressor according to an embodiment of the present invention, the target pressure setting means sets a target for low-pressure or control pressure, on the basis of external information detected by the external information detection means, and the current regulation means regulates, in its first regulation mode, the current supplied to the solenoid of the displacement control valve, on the basis of the high-pressure detected by the high-pressure detection means and the target for pressure set by the target pressure setting means.

Thus, in this displacement control system, the displacement is controlled to maintain the low-pressure or the control pressure at the target for pressure set by the target pressure setting means. Thus, only with a simple structure, the displacement is prevented from increasing to its maximum when the refrigerant quantity is insufficient, so that the compressor is protected from damage.

Further, in this displacement control system, the range of control of low-pressure or control pressure slides depending on the value of the high-pressure, which means that the low-pressure or the control pressure is controllable over a wide range. This enables reliable displacement control even when the operation of the refrigeration cycle entails a wide range of variation of the low-pressure. Consequently, even when the heat load on the refrigeration cycle is great, this displacement control system does not lose control over displacement and provides comfortably-conditioned air.

Further, this displacement control system allows the displacement control valve to have a valve body with a pressure receiving surface receiving the high-pressure, reduced in area. This enables a wide range of control of low-pressure or control pressure without requiring a large solenoid, even when the high-pressure is great in value. Consequently, even when the heat load on the refrigeration cycle is great, this displacement control system does not lose control over displacement.

Further, the high-pressure detection means, which is not a new element added for the present invention but an element indispensable for the refrigeration cycle to protect the compressor, does not lead to an increase in complexity of the displacement control system.

The displacement control system of the variable displacement compressor according to an embodiment reliably controls the displacement to maintain the low-pressure or the control pressure at the target for pressure set by the target pressure setting means, by regulating the current supplied to the solenoid on the basis of a difference between the high-pressure detected by the high-pressure detection means and the target for pressure.

In the displacement control system of the variable displacement compressor according to an embodiment, the high-pressure control detection means may detect the high-pressure at any location in the high-pressure section of the refrigeration cycle, and the target pressure setting means may set a target for low-pressure at any location in the low-pressure section of the refrigeration cycle. This allows the displacement control system to have great freedom of configuration.

In the displacement control system of the variable displacement compressor according to an embodiment, the pressure sensor provides accurate detection of the high-pressure, resulting in more appropriate control of the displacement.

In the displacement control system of the variable displacement compressor according to an embodiment, the high-pressure is indirectly detected from temperature of the refrigerant detected by the temperature sensor. This allows the displacement control system to have great freedom of configuration.

The displacement control system of the variable displacement compressor according to an embodiment regulates the current supplied to the solenoid in a manner accurately based on the high-pressure and intake pressure which the valve body of the displacement control valve actually receives. This leads to improved accuracy of intake pressure control.

The displacement control system of the variable displacement compressor according to an embodiment controls the displacement to maintain the temperature of air immediately after passing across the evaporator at the target for it. Consequently, this displacement control system provides comfortably-conditioned air.

In the displacement control system of the variable displacement compressor according to an embodiment, the external information detection means detects the temperature of air immediately after passing across the evaporator, which enables the displacement to be properly controlled to maintain the temperature of the air at the target for it.

In the displacement control system of the variable displacement compressor according to an embodiment, the target pressure setting means sets the target for pressure on the basis of the heat load on the refrigeration cycle, which enables the displacement to be properly controlled to maintain the temperature of air immediately after passing across the evaporator at the target for it.

In the displacement control system of the variable displacement compressor according to an embodiment, the target pressure setting means sets the target for intake pressure on the basis of the heat load on the refrigeration cycle and the operating conditions of the variable displacement compressor or the vehicle, which enables the displacement to be properly controlled to maintain the temperature of air immediately after passing across the evaporator at the target for it.

Further, this displacement control system of the variable control compressor allows a wide range of control of intake pressure or control pressure. Thus, the displacement control system applied to the automotive air conditioning system does not lose control over displacement, even when the heat load on the refrigeration cycle is great. Consequently, this displacement control system provides comfortably-conditioned air, without running into the necessity to stop the variable displacement compressor due to loss of displacement control.

The displacement control system of the variable displacement compressor according to an embodiment, which controls the displacement by controlling the low-pressure, have a plurality of setting modes, so that the displacement control system can control the displacement in an optimum manner by selecting a setting mode depending on the operating conditions of the air conditioning system or the vehicle. Particularly, by controlling the low-pressure according to the target set by the target pressure setting means in the second setting mode, the displacement is controlled to cause the variable-displacement-compressor driving load to approach the target for the driving load.

In the displacement control system of the variable displacement compressor according to an embodiment, by controlling the intake pressure according to the target set by the target pressure setting means in the third setting mode, the displacement is controlled to cause the high-pressure to approach the target for the high-pressure. The displacement control is optimized, for example by varying the target for the high-pressure as necessary.

In the displacement control system of the variable displacement compressor according to an embodiment, when the high-pressure exceeds an upper limit, priority is given to the third setting mode to control the displacement to cause the high-pressure to approach the target for it. This prevents abnormal increase of the high-pressure, thereby keeping the air conditioning system safe.

In the displacement control system of the variable displacement compressor according to an embodiment, the target for intake pressure is set to cause the calculated variable-displacement-compressor driving load to approach the target for driving load. This reliably causes the variable-displacement-compressor driving load to approach the target for driving load.

In the displacement control system of the variable displacement compressor according to an embodiment, the variable-displacement-compressor driving load is estimated on the basis of a difference between the high-pressure and the low-pressure or a difference between the high-pressure and the control pressure or a physical quantity correlating with one of these differences. In this case, the second setting mode does not require a complex structure.

In the displacement control system of the variable displacement compressor according to an embodiment, the variable-displacement-compressor driving load is accurately calculated on the basis of the current supplied to the solenoid, which enables the variable-displacement-compressor driving load to be caused to properly approach the target for driving load.

The displacement control system of the variable displacement compressor according to an embodiment takes the second setting mode, when determining that the air conditioning system has been switched on. This enables the driving load to be regulated at the time the variable displacement compressor is started, which contributes to stable engine control.

In the displacement control system of the variable displacement compressor according to an embodiment, the second setting mode is maintained for a predetermined period of time, which greatly contributes to stable engine control.

The displacement control system of the variable displacement compressor according to an embodiment regulates the variable-displacement-compressor driving load depending on the operating conditions of the vehicle, which contributes to maintaining satisfactory running performance of the vehicle and stable engine control, while maintaining a certain level of air conditioning performance.

The displacement control system of the variable displacement compressor according to an embodiment contributes to stable engine revolving speed when the vehicle is in an idling state.

The displacement control system of the variable displacement compressor according to an embodiment takes the second setting mode when at least either of throttle opening degree and engine revolving speed is greater than or equal to a predetermined value, which contributes to maintaining satisfactory high-speed or acceleration performance of the vehicle.

The displacement control system of the variable displacement compressor according to an embodiment prevents the variable-displacement-compressor driving load from becoming too great when the heat load is great, thereby maintaining the reliability of the variable displacement compressor.

In displacement control system of the variable displacement compressor according to an embodiment, stricter conditions are imposed for the second setting mode to be taken, to allow the second setting mode to be taken only when necessary, while maintaining as high air conditioning performance as possible.

In the displacement control system of the variable displacement compressor according to an embodiment, the execution conditions include a limitation that the current supplied to the solenoid in the first setting mode is greater than the current supplied to the solenoid in the second setting mode. This leads to making good use of the merit of taking the second setting mode to regulate the driving load.

The displacement control system of the variable displacement compressor according to an embodiment enables quick restoration of the previous state of conditioned air after leaving the second setting mode, thereby maintaining comfortably-conditioned air in the vehicle interior.

In the displacement control system of the variable displacement compressor according to an embodiment, by controlling the low-pressure according to the target set by the target pressure setting means in the second setting mode, the displacement is controlled to cause the variable-displacement-compressor driving load to approach the target for driving load.

In the displacement control system of the variable displacement compressor according to an embodiment, by controlling the low-pressure according to the target set by the target pressure setting means in the third setting mode, the displacement is controlled to cause the high-pressure to approach the target for high-pressure. The displacement control is optimized, for example by varying the target for high-pressure as necessary.

In the displacement control system of the variable displacement compressor according to an embodiment, the variable displacement compressor is a reciprocating compressor with variable stroke pistons. In the reciprocating variable displacement compressor, the minimum stroke of pistons determined by the minimum inclination of a swash plate can be very small, which means that the displacement can be varied over a wide range. This allows the displacement control system to fully enjoy the benefit of the widened range of control of low-pressure or control pressure.

In the displacement control system of the variable displacement compressor according to an embodiment, the target for pressure is within an appropriate range by being set between the preset upper and lower limits. Particularly, the lower limit for the target for pressure determines the value to which the displacement is controlled when the refrigerant quantity is insufficient.

In the displacement control system of the variable displacement compressor according to an embodiment, the upper and lower limits are varied on the basis of external information so that the target for pressure can be set to a value suited for the external information.

In the displacement control system of the variable displacement compressor according to an embodiment, when the high-pressure exceeds a preset upper limit for high-pressure, current is supplied to the solenoid to cause the high-pressure to approach the target for high-pressure. This prevents abnormal increase of the high-pressure, thereby keeping the air conditioning system safe.

The displacement control system of the variable displacement compressor according to an embodiment allows the displacement control valve to have a valve body with a pressure-receiving surface receiving the high-pressure, reduced in area, which leads to a widened range of control of intake pressure or control pressure. Thus, even when applied to an air conditioning system using carbon dioxide as a refrigerant where the high-pressure and the intake pressure are great in value, this displacement control system reliably controls the displacement without requiring a large solenoid.

BRIEF DESCRIPTION OF THE DRAWINGS

The present invention will be well understood from the following detailed description and the accompanying drawings which are given by way of illustration only, and thus, are not limitative of this invention, and wherein:

FIG. 9 is a block diagram schematically showing the configuration of a displacement control system of a variable displacement compressor according to a second embodiment.

BEST MODE OF CARRYING OUT THE INVENTION

Figure 1:
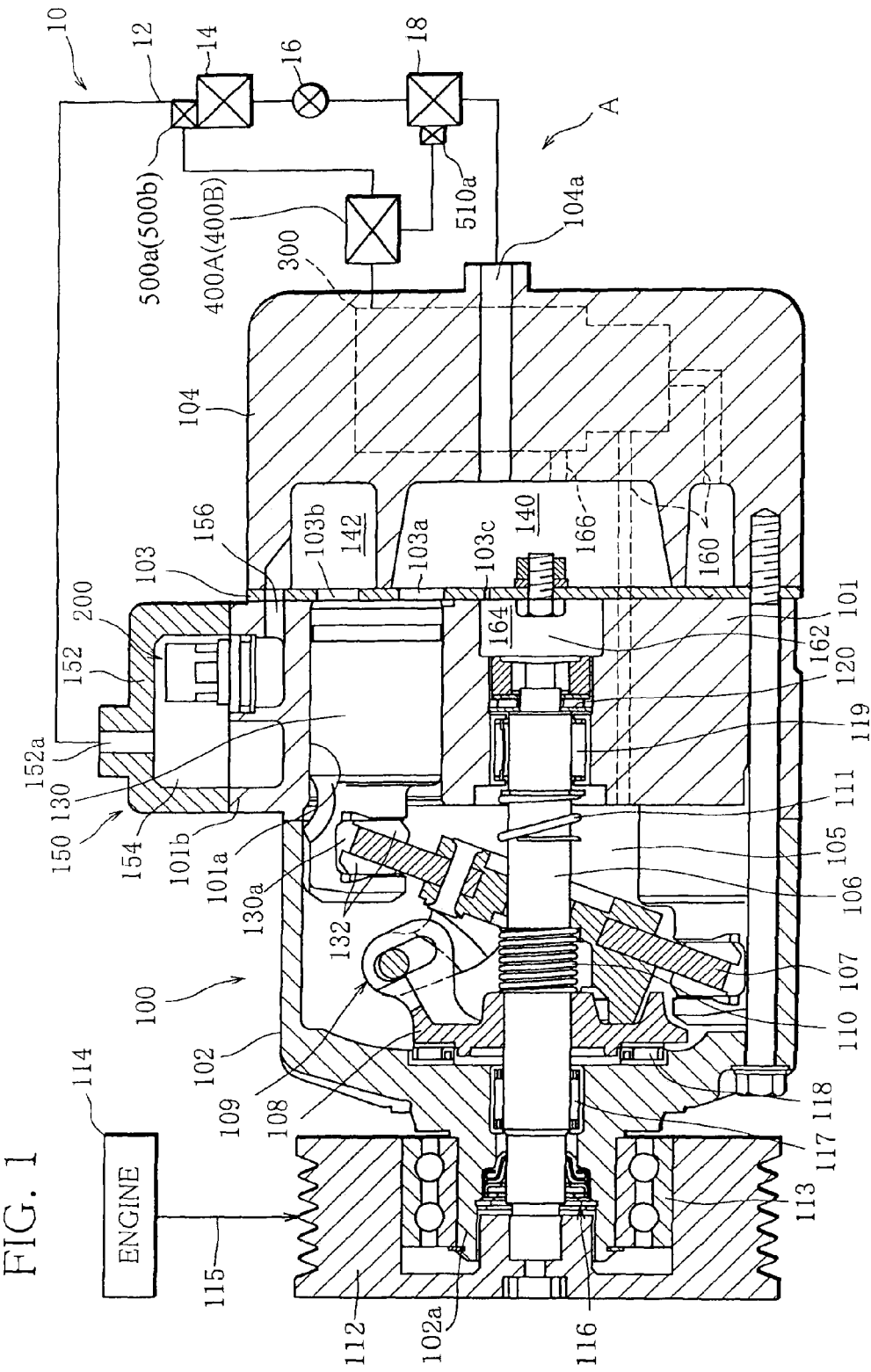
FIG. 1 is a diagram schematically showing the configuration of a refrigeration cycle of an automotive air conditioning system, together with a vertical cross-sectional view of a variable displacement compressor.

FIG. 1 shows a refrigeration cycle 10 of an automotive air conditioning system. The refrigeration cycle 10 includes a circulation line 12 along which a refrigerant, or an operating fluid circulates. In the circulation line 12, a compressor 100, a radiator (condenser) 14, an expansion device (expansion valve) 16 and an evaporator 18 are arranged serially along the direction of flow of the refrigerant. The compressor 100 put in operation causes the refrigerant to circulate along the circulation line 12. Specifically, the compressor 100 performs a process of drawing in the refrigerant, compressing the drawn-in refrigerant, and discharging the compressed refrigerant.

The evaporator 18 also constitutes a part of an air circuit of the automotive air conditioning system, and air passing across the evaporator 18 is cooled by the refrigerant taking heat to evaporate within the evaporator 18.

The compressor 100 to which a displacement control system A according a first embodiment is applied is a variable displacement compressor, for example a swash plate clutchless compressor. The compressor 100 includes a cylinder block 101, and the cylinder block 101 has a plurality of cylinder bores 101a. A front housing 102 is connected to a first end of the cylinder block 101, while a rear housing (cylinder head) 104 is connected to the opposite, second end of the cylinder block 101 with a valve plate 103 interposed between.

The cylinder block 101 and the front housing 102 define a crank chamber 105, and a drive shaft 106 extends axially inside the crank chamber 105. The drive shaft 106 extends through an annular swash plate 107 placed inside the crank chamber 105, and the swash plate 107 is hinged to a rotor 108 fixed on the drive shaft 106, by a joint 109. The swash plate 107 can therefore vary in inclination, while moving along the drive shaft 106.

A coil spring 110 is mounted on the drive shaft 106, between the rotor 108 and the swash plate 107, to push the swash plate 107 to tilt at a minimum angle. On the opposite side of the swash plate 107, specifically between the swash plate 107 and the cylinder block 101, a coil spring 111 is mounted on the drive shaft 106 to push the swash plate 107 to tilt at a maximum angle.

The drive shaft 106 extends through a boss 102a projecting outward from the front housing 102, and a pulley 112 as a power transmission device is connected to the outer end of the drive shaft 106. The pulley 112 is rotatably mounted on the boss 102a by means of a ball bearing 113, and a belt 115 is passed around the pulley and an engine 114 as an external drive source.

Inside the boss 102a, an axis sealing device 116 is provided to seal the front housing 102. The drive shaft 106 is rotatably supported by bearings 117, 118, 119 and 120 in its radial and thrust directions. Thus, power transmitted from the engine 114 to the pulley 112 causes the drive shaft to rotate in synchronization with the pulley 112.

A piston 130 is fitted within each cylinder bore 101a. The piston 130 has a tail portion integrally projecting into the crank chamber 105. In a recess 130a in the tail portion, a pair of shoes 132 is provided. The shoes 132 are in sliding contact with the periphery of the swash plate 107 on both sides thereof. Thus, the shoes 132 enable the piston 130 and the swash plate 109 to move in association with each other. With this mechanism, rotation of the drive shaft 106 is converted into reciprocating motion of each piston 130 inside its own cylinder bore 101a.

The rear housing 104 defines an intake chamber 140 and a discharge chamber 142. The intake chamber 140 can become connected to each cylinder bore 101a via each intake hole 103a in the valve plate 103. The discharge chamber 142 is connected to each cylinder bore 101a via each discharger hole 103b in the valve plate 103. The intake hole 103a and the discharge hole 103b are opened and closed by an intake valve and a discharge valve, not shown, respectively.

A muffler 150 is provided outside the cylinder block 101, and a muffler casing 152 is joined to a muffler base 101b formed integrally with the cylinder block 101, with a sealing member, not shown, interposed between. The muffler casing 152 and the muffler base 101b define a muffler space 154, and the muffler space 154 is connected to the discharge chamber 142 by a discharge passage 156 which extends in the wall of the rear housing 104 and through the valve plate 103 and the wall of the muffler base 101b.

The muffler casing 152 has a discharge port 152a, and a check valve 200 is provided in the muffler space 154 to prevent flow between the discharge passage 156 and the discharge port 152a. Specifically, the check valve 200 opens or closes depending on a difference in pressure between the discharge passage 156 and the muffler space 154, specifically it closes when the pressure difference becomes smaller than a specified value, and opens when the pressure difference becomes greater than the specified value.

Thus, the discharge chamber 142 can become connected to the outgoing side of the circulation line 12 via the discharge passage 156, the muffler space 154 and the discharge port 152a, and the muffler space 154 is connected or disconnected by the check valve 200. The intake chamber 140 is connected to the incoming side of the circulation line 12 via an intake port 104a in the rear housing 104.

The rear housing 104 contains a displacement control valve (solenoid valve) 300, and the displacement control valve 300 is incorporated in a gas supply passage 160. The gas supply passage 160 extends in the wall of the rear housing 104 and through the valve plate 103 and the cylinder block 101, thereby connecting the discharge chamber 142 and the crank chamber 105.

The intake chamber 140 is connected to the crank chamber 105 by a gas release passage 162. The gas release passage 162 consists of a clearance between the drive shaft 106 and the bearings 119, 120, a space 164 and a fixed orifice 103c in the valve plate 103.

The intake chamber 140 is connected to the displacement control valve 300 by a pressure sensing passage 166 extending in the wall of the rear housing, independently from the gas supply passage 160.

Figure 2:
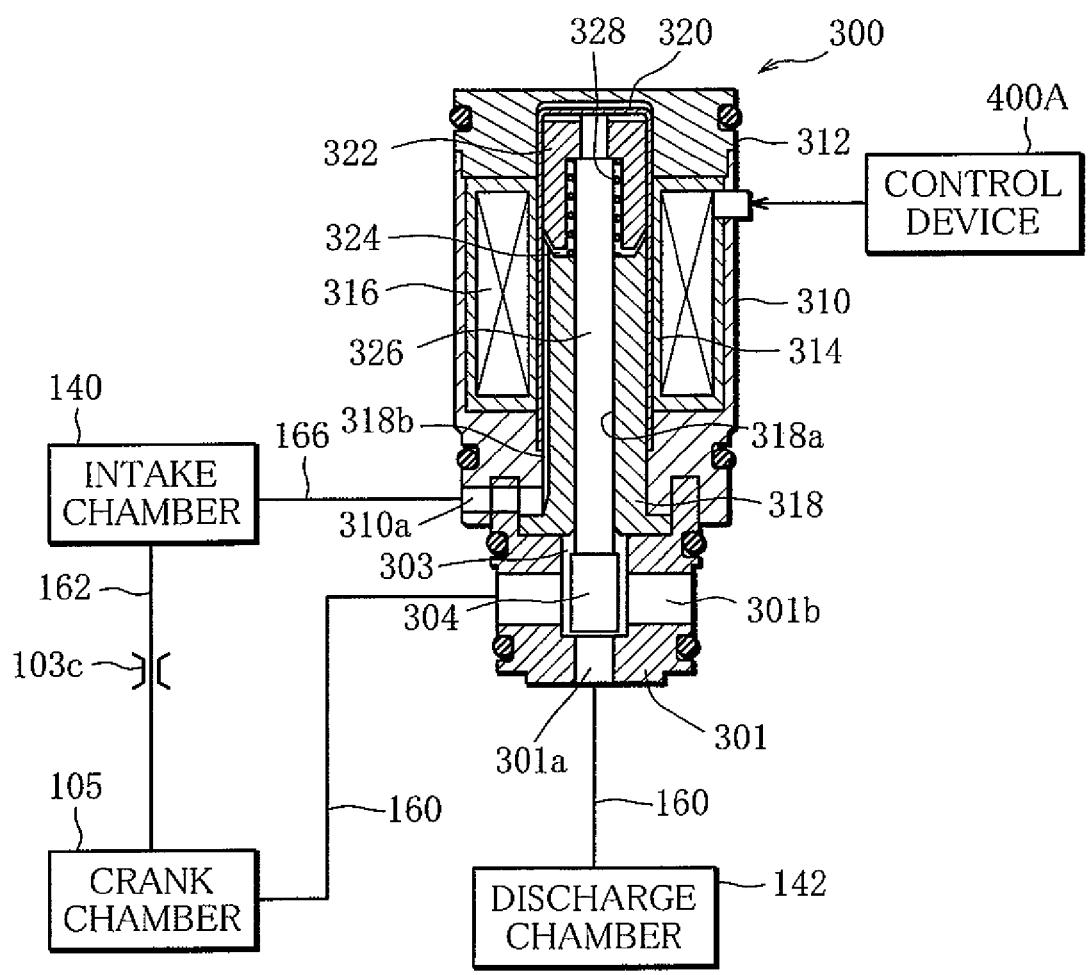
FIG. 2 is a diagram for explaining how a displacement control valve is connected to the variable displacement compressor of FIG. 1.

More specifically, as shown in FIG. 2, the displacement control valve 300 consists of a valve unit and a drive unit opening and closing the valve unit. The valve unit includes a cylindrical valve housing 301, and the valve housing 301 has an inlet port (valve hole 301a) at a first end. The valve hole 301a is connected to the discharge chamber 142 by an upstream side of the gas supply passage 160, and communicates with a valve chamber 303 defined inside the valve housing 301.

A columnar valve body 304 is fitted within the valve chamber 303. Within the valve chamber 303, the valve body 304 can move along the axis of the valve housing 301, and can close the valve hole 301a by coming in contact with the end face of the valve housing 301. The end face of the valve housing 301 thus functions as a valve seat.

An outlet port 301b is formed in the cylindrical wall of the valve housing 301. The outlet port 301b is connected to the crank chamber 105 by a downstream side of the gas supply passage 160. Also the outlet port 301b communicates with the valve chamber 303. Thus, the discharge chamber 142 can become connected to the crank chamber 105 via the valve hole 301a, the valve chamber 303 and the outlet port 301b.

The drive unit includes a cylindrical solenoid housing 310. The solenoid housing 310 is coaxially connected to the valve housing 301 at a second end opposite to the aforementioned first end. An open end of the solenoid housing 310 is closed with an end cap 312. A solenoid 316 consisting of a coil of wire wound on a bobbin 314 is fitted inside the solenoid housing 310.

Also a cylindrical fixed core 318 is arranged inside the solenoid housing 310, coaxially. The fixed core 318 extends from the valve housing 301 toward the end cap 312, up to the middle of the solenoid 316. The end cap 312 side of the fixed core 318 is surrounded by a sleeve 320, and the sleeve 320 is closed at the end cap 312 side end.

The fixed core 318 has a through-hole 318a through its center. The through-hole 318a communicates with the valve chamber 303 at a first end. A core holding space 324 holding a movable cylindrical core 322 is defined between the fixed core 318 and the closed end of the sleeve 320, and the through-hole 318a communicates with the core holding space 324 at a second end opposite to the aforementioned first end.

A solenoid rod 326 is slidably fitted in the through-hole 318a, and the valve body 304 is integrally and coaxially connected to a first end of the solenoid rod 326. The opposite, second end portion of the solenoid rod 326 projects into the core holding space 324. The second end portion of the solenoid rod 326 is fitted in a through-hole in the movable core 322 so that the solenoid rod 326 and the movable core 322 are integrated. A release spring 328 is set between a step face of the movable core 322 and the end face of the fixed core 318, and a specified clearance is provided between the movable core 322 and the fixed core 318.

The movable core 322, the fixed core 318, the solenoid housing 310 and the end cap 312 are each made of a magnetic material, and constitute a magnetic circuit. The sleeve 320 is made of a stainless-based nonmagnetic material.

The solenoid housing 310 has a pressure sensing port 310a, and the pressure sensing port 310a is connected to the intake chamber 140 by a pressure sensing passage 166. The fixed core 318 has an axially-extending pressure sensing groove 318b in its outer cylindrical surface, and the pressure sensing groove 318b communicates with the pressure sensing port 310a. Thus, the intake chamber 140 and the movable-core holding space 324 are connected via the pressure sensing port 310a and the pressure sensing groove 318b, and pressure in the intake chamber 140 (hereinafter referred to as "intake pressure Ps") acting in the valve-closing direction is transmitted to the rear face of the valve body 304 via the solenoid rod 326.

In the displacement control valve 300, it is desirable that the area of the surface of the valve body 304 on which pressure in the discharge chamber 142 (hereinafter referred to as "discharge pressure Pd") acts (which area will be called "sealing surface area Sv") when the valve body 304 is in a position closing the valve hole 301a be equal to the area of the surface of the valve body 304 on which the intake pressure Ps acts, thus equal to the cross-sectional area of the solenoid rod 326. In this case, pressure in the crank chamber 105 (hereinafter referred to as "crank pressure Pc") does not act on the valve body 304 in the valve-opening or valve-closing direction.

A control device 400A provided outside the compressor 100 is connected to the solenoid 316. When a control current I is supplied from the control device 400A, the solenoid 316 generates magnetic force F(I). The magnetic force F(I) generated by the solenoid 316 attracts the movable core 322 toward the fixed core 318, thus acts on the valve body 304 in the valve-closing direction.

Figure 3:
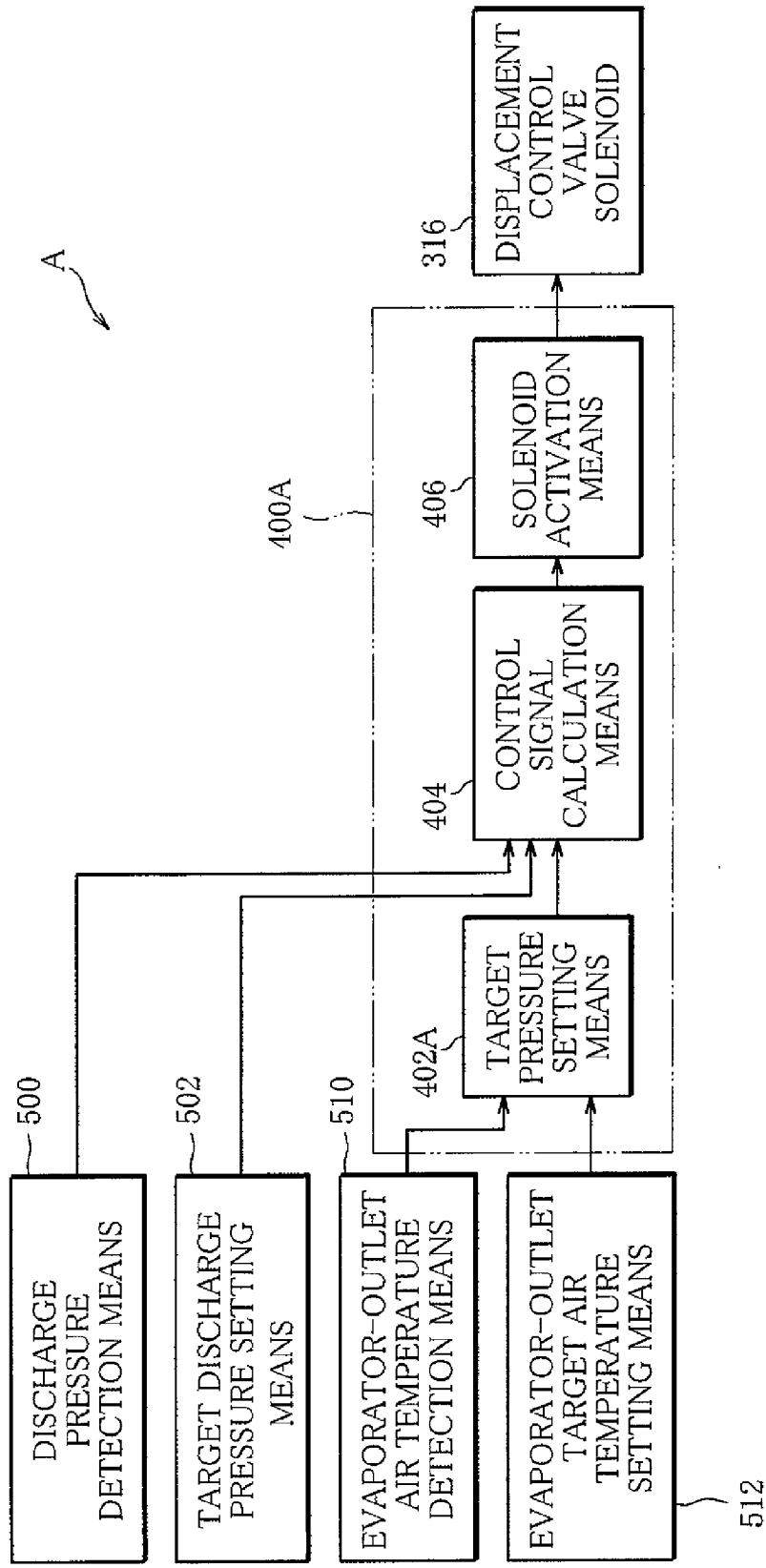
FIG. 3 is a block diagram schematically showing the configuration of a displacement control system of a variable displacement compressor according to a first embodiment.

FIG. 3 is a block diagram schematically showing the configuration of the displacement control system A including the control device 400A.

The displacement control system A includes a means for detecting the discharge pressure Pd (discharge pressure detection means) 500. A pressure sensor 500a constituting the discharge pressure detection means 500 is fitted to the inlet side of the condenser 14 to detect the pressure of the refrigerant at that location as the discharge pressure Pd (see FIG. 1).

The displacement control system A includes a target discharge pressure setting means 502 for setting a target discharge pressure Pdset2, namely a target for the discharge pressure Pd.

The displacement control system A also includes a means for detecting the temperature Teo of air at an air outlet of the evaporator 18 constituting the air circuit (evaporator-outlet air temperature detection means) 510. The evaporator-outlet air temperature detection means 510 is composed of a temperature sensor 510a. The temperature sensor 510a is arranged at the air outlet of the evaporator 18 constituting the air circuit to detect the temperature Teo of air immediately after passing across the evaporator 18 (see FIG. 1).

The displacement control system A further includes a means (evaporator-outlet target air temperature setting means) 512 for setting a target Tset for the temperature Teo of air at the air outlet of the evaporator 18 (evaporator-outlet target air temperature), which serves as a target in displacement control on the compressor 100, on the basis of external information including a vehicle-interior temperature setting.

The target discharge pressure setting means 502 as well as the evaporator-output target air temperature setting means 512 can be composed of components of an air conditioning ECU controlling the operation of the entire air conditioning system, for example.

The control device 400A is composed of an ECU (electronic control unit), for example, and includes a target pressure setting means 402A, a control signal calculation means 404 and a solenoid activation means 406.

The target pressure setting means 402A sets a target for the intake pressure Ps (target intake pressure Psset) serving as a target in control, on the basis of a differential ΔT between the evaporator-outlet air temperature Teo actually detected by the evaporator-outlet air temperature detection means 510 and the evaporator-outlet target air temperature Tset set by the evaporator-outlet target air temperature setting means 512. Thus, for the target pressure setting means 402A, the evaporator-outlet air temperature detection means 510 and the evaporator-outlet target air temperature setting means 512 constitute an external information detection means delivering the evaporator-outlet air temperature Teo and a target for it, namely the evaporator-outlet target air temperature Tset as external information.

The control signal calculation means 404 calculates the control current I, namely the current to be supplied to the solenoid 316 of the displacement control valve 300, from the target intake pressure Psset set by the target pressure setting means 402A and the discharge pressure Pd detected by the discharge pressure detection means 500, using a predetermined arithmetic expression.

The solenoid activation means 406 activates the solenoid 316 of the displacement control valve 300 by supplying the control current I determined by the control signal calculation means 404. The control current I is regulated by varying the duty ratio by PWM (pulse width modulation) at a specified drive frequency (between 400 and 500 Hz, for example). The solenoid activation means 406 detects the current flowing through the solenoid 316 and performs feedback-control so that the detected value will follow the value determined by the control signal calculation means 404.

Next, the operation of the above-described displacement control system A (how to use it) will be described.

Figure 4:
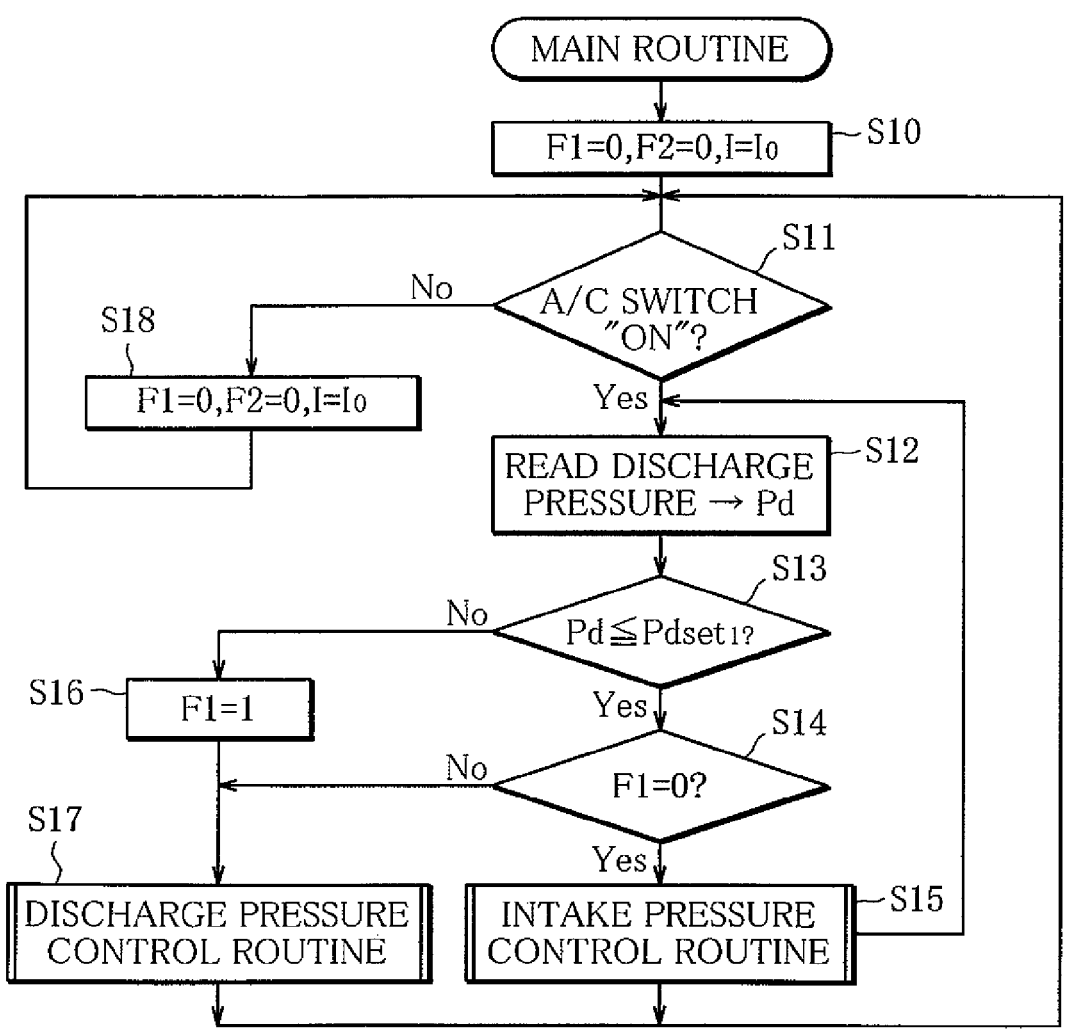
FIG. 4 is a control flow chart showing a main routine performed by the displacement control system of FIG. 3.

FIG. 4 is a flow chart showing a main routine executed by the control device 400A. The main routine, is started when the engine key of the vehicle is put into "ON" position, and stopped when it is put into "OFF" position, for example.

In the main routine, first, initial conditions are set (S10). Specifically, flags F1 and F2 are set to "0", and the control current I to be supplied to the solenoid 316 of the displacement control valve 300 is set to a value $I_0$. The initial value $I_0$ for the control current is determined to result in a minimum displacement of the compressor 100, and can be "0", for example.

Next, whether or not an air conditioning switch (A/C) of the automotive air conditioning system is in "ON" position is determined (S11). In other words, whether or not a passenger has made a request for vehicle-interior cooling or dehumidification is determined. If the air conditioning switch is "ON" ("Yes"), the discharge pressure Pd detected by the discharge pressure detection means 500 is read (S12).

Then, the read discharge pressure Pd and a preset upper limit Pdset1 for the discharge pressure are compared (S13). If the comparison finds the discharge pressure Pd to be less than or equal to the upper limit Pdset1 for it ("Yes"), whether or not the flag F1 is "0" is determined (S14). Since the flag F1 is initially set to "0", the result of determination is "Yes", so that displacement control is performed according to an intake pressure control routine S15.

If, at S13, the discharge pressure Pd is found to be greater than the upper limit Pdset1 for it ("No"), the flag F1 is set to "1" (S16) and then displacement control is performed according to a discharge pressure control routine S17. Once the flag F1 is set to "1", the result of determination at S14 stays "No" even when the result of determination at S13 changes to "Yes". Thus, the displacement control according to the discharge control routine S17 continues to be performed. The condition for leaving the discharge pressure control routine S17 is defined in the discharge pressure control routine S17.

The control device 400A thus performs either the intake pressure control routine S15 or the discharge pressure control routine S17, selectively. The intake pressure control routine S15 defines a normal control mode (first regulation mode) primarily aimed at air conditioning by the automotive air conditioning system, while the discharge pressure control routine S17 defines an emergency control mode (second regulation mode) primarily aimed at keeping the automotive air conditioning system safe, etc.

Incidentally, when the air conditioning switch is put into "OFF" position, the result of determination at S11 changes to "No", so that the flags F1, F2 and the control current I are reset (S18).

Figure 5:
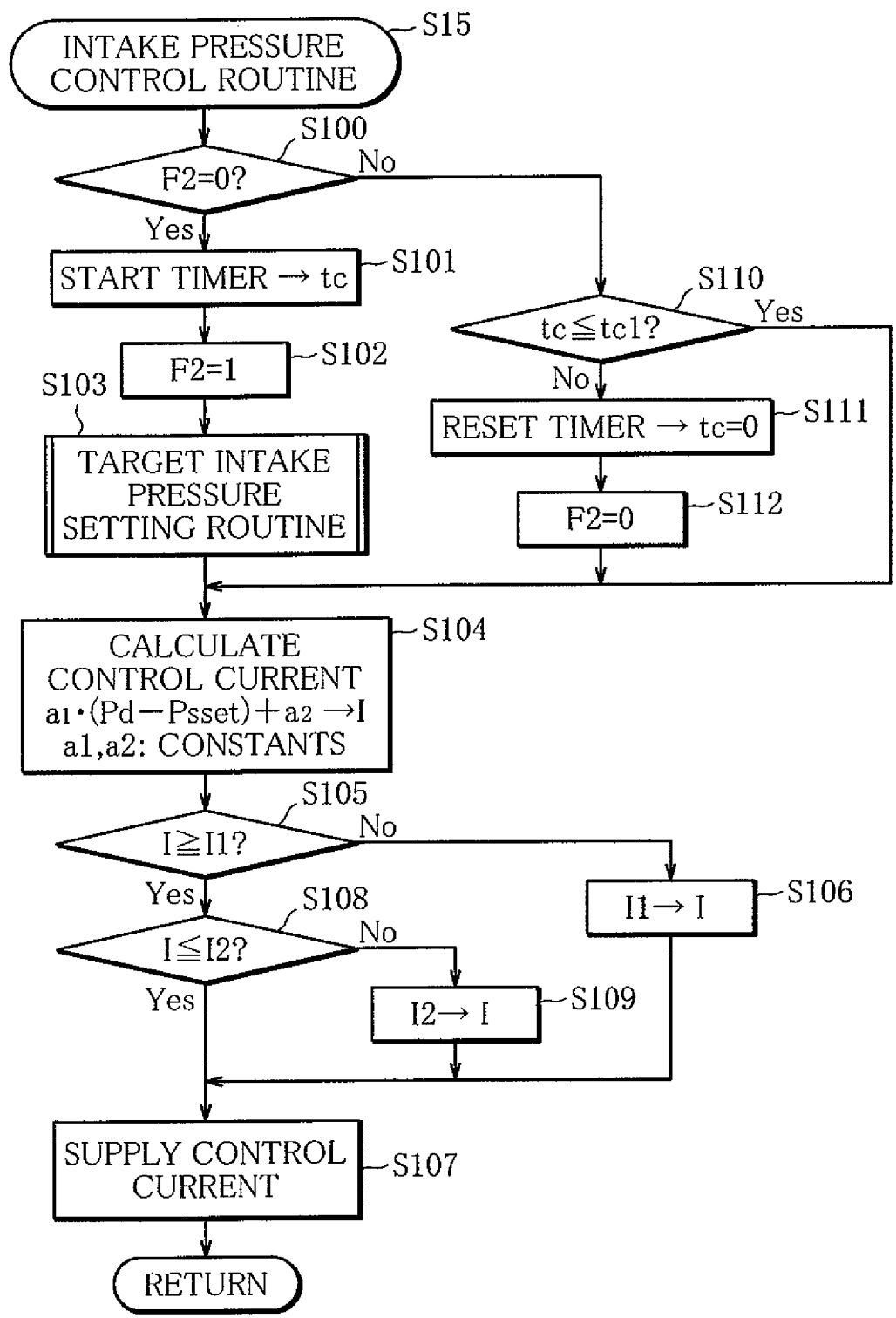
FIG. 5 is a control flow chart showing an intake pressure control routine included in the main routine of FIG. 4.

FIG. 5 is a flow chart showing the details of the intake pressure control routine S15 included in FIG. 4. In the intake pressure control routine S15, first, whether or not the flag F2 is "0" is determined (S100). The flag F2 is initially set to "0", so that the result of determination is "Yes", so that a timer is started to measure elapsed time tc (S101) and the flag F2 is set to "1" (S102).

Then a target Psset for the intake pressure, which serves as a target in control, is set according to a target intake pressure setting routine S103. Then, the control current I to be supplied to the solenoid 316 is calculated from the target intake pressure Psset set at S103 and the discharge pressure Pd detected by the discharge pressure detection means 500, using a predetermined arithmetic expression (S104). For example, the control current I is obtained by adding a constant a2 to the difference between the discharge pressure Pd and the target intake pressure Psset, multiplied by a proportional constant a1, as indicated in FIG. 5.

The control current I calculated at S104 is compared with a preset lower limit I1 (S105). If the comparison at S105 finds the calculated control current I to be less than the lower limit I1 ("No"), the lower limit I1 is read as a control current value I (S106) and control current of this value I is supplied to the solenoid 316 (S107).

If, on the other hand, the comparison at S105 finds the calculated control current I to be greater than or equal to the lower limit I1 ("Yes"), then the calculated control current I is compared with a preset upper limit I2, which is greater than the lower limit I1 (S108). If the comparison at S108 finds the calculated control current I to be greater than the upper limit I2 ("No"), the upper limit I2 is read as a control current value I (S109), and control current of this value I is supplied to the solenoid 316 (S107).

Thus, if the comparison at S105 and S108 finds control current of the value calculated at S104 is supplied to the solenoid 316 (S107).

After S107, the control device 400A returns from the intake pressure control routine S15 to the main routine, and at S12, reads the latest discharge pressure Pd detected by the discharge pressure detection means 500. Then, if the results of determination at S13 and S14 are "Yes", the intake pressure control routine S15 is performed for the second time.

In the second-time execution of the intake pressure control routine S15, the result of determination at S100 is "No" since the flag F2 was set to "1" last time, and whether or not the elapsed time tc measured by the timer has reached a preset time tc1 is determined (S110). If it is determined at S110 that the preset time tc1 has not elapsed yet after the timer was started ("Yes"), the control current I is calculated from the target intake pressure Psset set at S103 last time and the discharge pressure Pd read at S12 this time (S104). After this, the control device 400A performs S107 in the same manner as the first time and returns to the main routine.

If, on the other hand, the elapsed time tc measured by the timer exceeds the preset time tc1 so that the result of determination at S110 changes to "No", the timer is reset (S111) and the flag F2 is set to "0" (S112). This means that the target Psset for the intake pressure is set every preset time tc1. This setting interval tc1 is preset to 5 sec., for example.

To sum up, the control device 400A regularly reads the discharge pressure Pd and calculates and regulates the control current I so as to maintain the intake pressure at the set target Psset in spite of the varying discharge pressure Pd, where the target Psset for the intake pressure is set at intervals of the preset time tc1.

Figure 6:
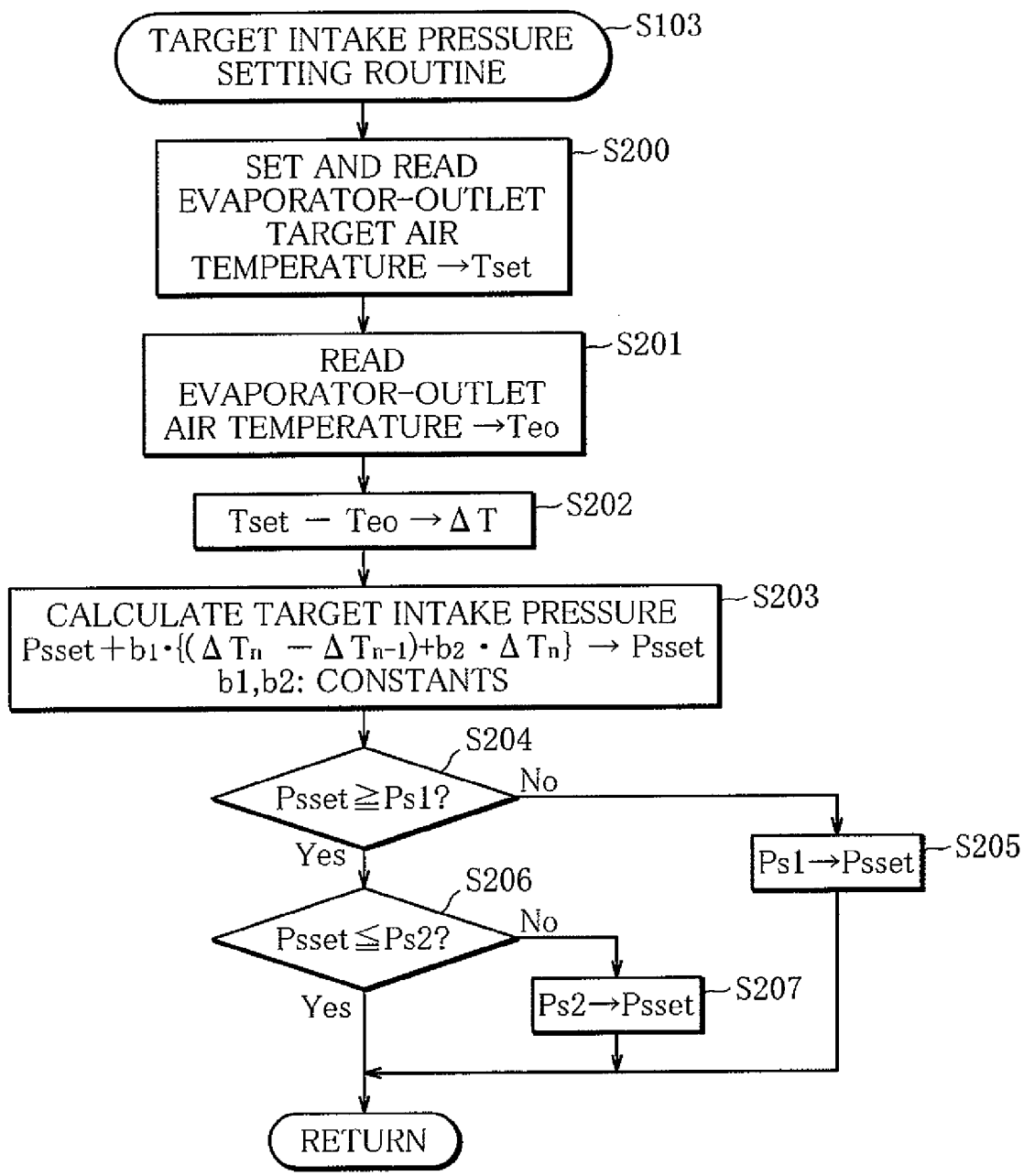
FIG. 6 is a control flow chart showing a target intake pressure setting routine included in the intake pressure control routine of FIG. 5.

FIG. 6 is a flow chart showing the details of the target intake pressure setting routine S103 included in FIG. 5.

In the target intake pressure setting routine S103, first, a target Tset for the evaporator-outlet air temperature, which serves as a target in displacement control on the compressor 100, is set and read (S200). Then, the evaporator-outlet air temperature Teo detected by the evaporator-outlet air temperature detection means 510 is read (S201), and a differential $\Delta T$ between the evaporator-outlet target air temperature Tset set by the evaporator-outlet target air temperature setting means 512 and the evaporator-outlet actual air temperature Teo detected by the evaporator-outlet air temperature detection means 510 is calculated (S202). Then, the target Psset for the intake pressure is calculated on the basis of the calculated differential $\Delta T$, using an arithmetic expression predetermined for PI control, for example (S203).

It is to be noted that the arithmetic expression at S203 includes the target intake pressure Psset, which is initially set, for example on the basis of outside air temperature Tamb, by the equation:

$$Psset = K1 \cdot Tamb + K2 \ (K1, K2:\text{constants})$$

The differential $\Delta T$ is calculated at S202 each time the target intake pressure setting routine S103 is executed. In the arithmetic expression at S203, the subscript n appended to the differential $\Delta T$ indicates that the differential $\Delta T$ has been calculated at S202 this time, while the subscript n−1 indicates that the differential $\Delta T$ was calculated at 202 last time.

Then, the calculated target intake pressure Psset is compared with a preset lower limit Ps1 (S204). If the result of determination at S204 is "No", the lower limit Ps1 is read as a target intake pressure Psset (S205).

If, on the other hand, the result of determination at S204 is "Yes", the calculated target Psset is compared with a preset upper limit Ps2, which is greater than the lower limit Ps1 (S206), and if the result of determination at S206 is "No", the upper limit Ps2 is read as a target intake pressure Psset (S207).

Thus, if the comparison at S204 and S206 finds Ps1≤Psset≤Ps2, the target intake pressure Psset calculated at S203 is read as a target intake pressure Psset.

Figure 7:
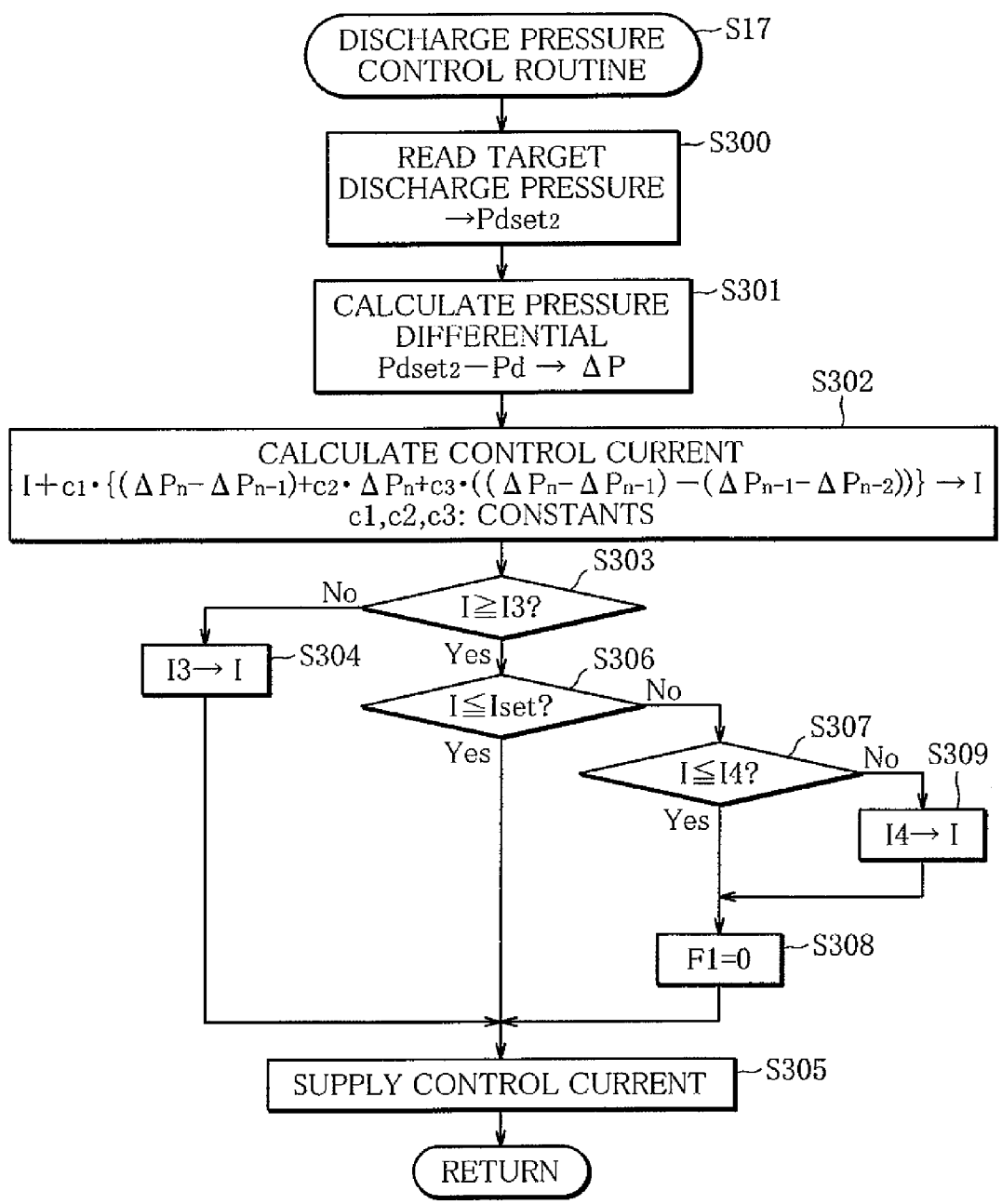
FIG. 7 is a control flow chart showing a discharge pressure control routine included in the main routine of FIG. 4.

FIG. 7 is a flow chart showing the details of the discharge pressure control routine S17 included in FIG. 4.

In the discharge pressure control routine S17, first, a target Pdset2 for the discharge pressure set by the target discharge pressure setting means 502 is read (S300). The target discharge pressure Pdset2 is set to be smaller than an upper limit Pdset1 for the discharge pressure (Pdset2<Pdset1). Then a differential $\Delta P$ between the target discharge pressure Pdset2 and the discharge pressure Pd detected by the discharge pressure detection means 500 is calculated (S301). Then, the control current I to be supplied to the solenoid 316 is calculated on the basis of the differential $\Delta P$ using an arithmetic expression predetermined for PID control, for example (S302).

The differential $\Delta P$ is calculated at S301 each time the discharge pressure control routine S17 is executed. In the arithmetic expression at S302, the subscript n appended to the differential $\Delta P$ indicates that the differential $\Delta P$ has been calculated at S301 this time, the subscript n−1 indicates that the differential $\Delta P$ was calculated at S301 last time, and the subscript n−2 indicates that the differential $\Delta P$ was calculated at S301 last time but one.

The control current I calculated at S302 is compared with a preset lower limit I3 (S303). If it is determined at S303 that the calculated control current I is less than the lower limit I3 ("No"), the lower limit I3 is read as a control current value I (S304), and control current of this value I is supplied (S305). If, on the other hand, the result of determination at S303 is "Yes", the calculated control current I is compared with a preset threshold Iset, which is greater than the lower limit I3 (S306). If it is determined at S306 that the calculated control current I is less than or equal to the threshold Iset ("Yes"), control current of the calculated value I is supplied to the solenoid 316 (S305).

If the result of determination at S306 is "No", the calculated control current I is compared with a preset upper limit I4, which is greater than or equal to the threshold Iset (S307). If it is determined at S307 that the control current I is less than or equal to the upper limit I4 ("Yes"), the flag F1 is set to "0" (S308) and control current of the calculated value I is supplied to the solenoid 316 (S305).

If the result of determination at S307 is "No", the upper limit I4 is read as a control current value I (S309), then the flag F1 is set to "0" (S308), and then control current of the value I is supplied to the solenoid 316 (S305).

As described above, the discharge pressure control routine S17 is prepared such that the control device 400A calculates a differential between the discharge pressure Pd detected by the discharge pressure detection means 500 and the target Pdset2 for the discharge pressure and regulates the control current I on the basis of the differential, thereby controlling the displacement to maintain the discharge pressure Pd at the target Pdset2 for the discharge pressure.

The condition for leaving the discharge pressure control routine S17 is determined by the threshold Iset. For example, the threshold Iset=I4 can minimize the frequency of switching back to the discharge pressure control routine S17 immediately after a switch from the discharge pressure control routine S17 to the intake pressure control routine S15.

As described above, in the intake pressure control routine S15 which the control device 400A performs in the normal control mode (first regulation mode), the target pressure setting means 402A sets the target intake pressure Psset, namely the target for the pressure in the intake chamber 140. Then, the control signal calculation means 404 calculates the control current I to be supplied to the solenoid 316, on the basis of the discharge pressure Pd detected by the discharge pressure detection means 500 and the target intake pressure Psset set by the target pressure setting means 402A, and then the solenoid activation means 406 supplies current to the solenoid 316 according to the control current I calculated by the control signal calculation means 404.

Thus, in the displacement control system A, the control current I is calculated on the basis of the preset target intake pressure Psset and the detected discharge pressure Pd, and supplied to the solenoid 316.

Further, in the target intake pressure setting routine S103 of the displacement control system A, a differential ΔT between the evaporator-outlet target air temperature Tset set by the evaporator-outlet target air temperature setting means 512 and the evaporator-outlet air temperature Teo detected by the evaporator-outlet air temperature detection means 510 constituting the external information detection means is calculated, the target intake pressure Psset is regulated on the basis of the calculated differential ΔT, and the control current I is calculated on the basis of a difference between the regulated target intake pressure Psset and the discharge pressure Pd.

By supplying the solenoid 316 with the control current I calculated on the basis of the regulated target intake pressure Psset, the displacement is controlled to maintain the evaporator-outlet air temperature Teo at the evaporator-outlet target air temperature Tset.

In the discharge pressure control routine S17 which the control device 400A performs in the emergency control mode (second regulation mode), on the other hand, a differential ΔP between the target discharge pressure Pdset2 and the discharge pressure Pd detected by the discharge pressure detection means 500 is calculated, and the control current I is regulated on the basis of the calculated differential ΔP to control the displacement to maintain the discharge pressure Pd at the target discharge pressure Pdset2.

In the displacement control system A of the variable displacement compressor 100 according to the first embodiment, the target pressure setting means 402A, the control current calculation means 404 and the solenoid activation means 406 constitute a regulation means regulating the control current I supplied to the solenoid 316.

The regulation means can control the displacement in one or more regulation modes, specifically it performs the intake pressure control routine S15 in a first regulation mode, and the discharge pressure control routine S17 in a second regulation mode.

In the intake pressure control routine S15 of this displacement control system A, the displacement is controlled to maintain the evaporator-outlet air temperature Teo at the evaporator-outlet target air temperature Tset, so that comfort is maintained in the vehicle interior.

In particular, by regulating the control current I supplied to the solenoid 316 on the basis of a difference between the discharge pressure Pd detected by the discharge pressure detection means 500 and the target intake pressure Psset set by the target pressure setting means 402A, the displacement is reliably controlled to maintain the intake pressure Ps at the target intake pressure Psset.

Further, in the displacement control system A, the temperature sensor 510a constituting the evaporator-outlet air temperature detection means 510 directly detects the evaporator-outlet air temperature Teo, which enables the displacement to be properly controlled to maintain the evaporator-outlet air temperature Teo at the evaporator-outlet target air temperature Tset.

Further, the displacement control system A controls the intake pressure Ps. Thus, if the intake pressure Ps drops due to insufficiency of refrigerant quantity, the displacement is reduced to maintain the intake pressure Ps at the target intake pressure Psset, where the displacement is reduced finally to its minimum. Thus, although the displacement control valve 300 has a simple structure not including a conventional pressure-sensing member composed of a bellows or the like, insufficiency of refrigerant quantity does not cause the displacement to increase to its maximum, so that the compressor 100 is protected from damage.

Further, the displacement control system A controls the intake pressure Ps, where the range of control of intake pressure Ps is wide. The reason is as follows:

In the displacement control valve 300, the forces acting on the valve body 304 are discharge pressure Pd, intake pressure Ps, electromagnetic force F(I) generated by the solenoid 316, and force fs exerted by the release spring 328, where the discharge pressure Pd and the force fs exerted by the release spring 328 act in the valve-opening direction while the other forces, i.e., the intake pressure Ps and the electromagnetic force F(I) generated by the solenoid 316 act in the valve-closing direction opposite to the valve-opening direction.

This relationship is represented by equation (1) below, which is rearranged into equation (2) below. The equations (1) and (2) show that determining the value of the discharge pressure Pd and the value of the electromagnetic force F(I), thus, the value of the control current I gives the value of the intake pressure Ps.

Figure 8:
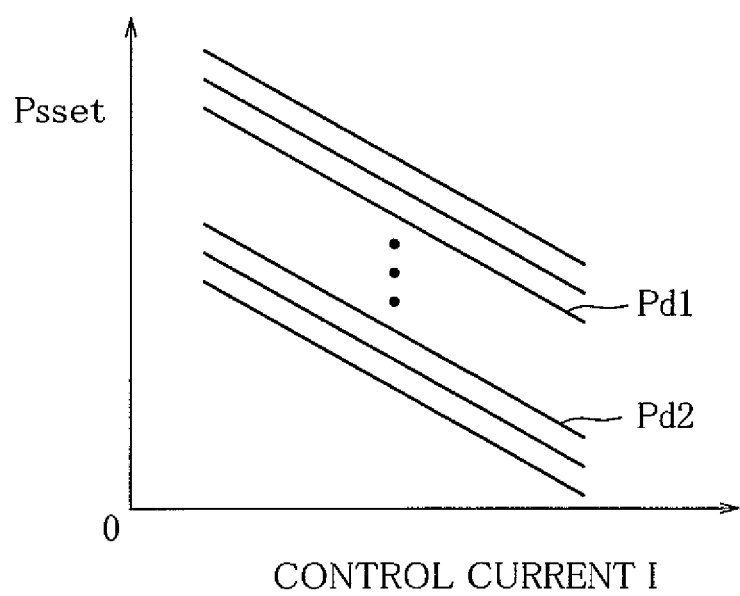
FIG. 8 is a graph showing a relationship among control current, target intake pressure and discharge pressure.

This relationship allows the to-be-generated electromagnetic force F(I), thus the to-be-supplied control current I, to be calculated from the preset target Psset for intake pressure and the detected value of the varying discharge pressure Pd, as shown in FIG. 8. By regulating the current supplied to the solenoid 316 according to the calculated control current I, the valve body 304 is operated to maintain the intake pressure Ps at the target intake pressure Psset, so that the crank pressure Pc is regulated. Consequently, the displacement is controlled to maintain the intake pressure Ps at the target intake pressure Psset.

In the control maintaining the intake pressure Ps at the target intake pressure Psset, the range of control of intake pressure Ps slides high pressure side as the discharge pressure Pd increases, as shown in FIG. 8. Specifically, for a discharge pressure Pd1 higher than a discharge pressure Pd2, the range of control of intake pressure Ps slides high pressure side.

Further, equation (2) shows that for an optional discharge pressure Pd, smaller sealing surface area Sv allows a wider range of control of target intake pressure Psset by small electromagnetic force F(I). This widened range of control based on smaller sealing surface area and the fact that the range of control of target intake pressure Psset slides depending on the discharge pressure allow the target intake pressure Psset to be controlled over a greatly widened range.

It is to be noted that an increase in current supplied to the solenoid 316 can decrease the intake pressure Ps. When no current is supplied to the solenoid 316, the valve hole 301a is forcedly opened since the release spring 328 exerts the force fs pulling the valve body 304 away from the valve hole. This allows the refrigerant to flow from the discharge chamber 142 to the crank chamber 105, so that the displacement is maintained at its minimum.

As described above, the displacement control system A can control the intake pressure Ps over a wide range, thus, reliably control the displacement even when the intake pressure Ps varies over a wide range depending on the operating conditions of the automotive air conditioning system. For example, even with a high heat load, the displacement can be reliably controlled by the control current I appropriately calculated on the basis of the target intake pressure Psset and the discharge pressure Pd.

In the above-described displacement control system A, the displacement control valve 300 is allowed to have a sealing surface (pressure-sensing surface) sensing the discharge pressure Pd, reduced in area Sv, which enables a wide range of control of intake pressure Ps, even with high discharge pressure Pd, without requiring a large solenoid 316.

Further, the discharge pressure detection means 500 is originally an element indispensable to the air conditioning system to protect the compressor 100, not a new element added according to the present invention. Thus, the use of the discharge pressure detection means 500 does not lead to an increase in complexity of the displacement control system A.

Further, in the above-described displacement control system A, in order to ensure that the target intake pressure Psset is set in an appropriate range, the allowable range for the target intake pressure Psset is defined by the upper and lower limits Ps2 and Ps1. Particularly, the lower limit Ps1 for the target intake pressure Ps determines the value to which the displacement controlled when the refrigerant quantity is insufficient. Thus, even when the refrigerant quantity is insufficient, the compressor 100 is reliably prevented from reaching the maximum displacement, thus protected from damage.

Further, in the above-described displacement control system A, the displacement control valve 300 is allowed to have a valve body 304 with a pressure-sensing surface receiving the discharge pressure Pd, reduced in area, which enables a wide range of control of intake pressure Ps. Thus, even when applied to an air conditioning system using carbon dioxide as a refrigerant in which the high-pressure and the low-pressure are great in value, the displacement control system can reliably control the displacement without requiring a large solenoid 316.

In the above-described displacement control system A, when the discharge pressure Pd is higher than the preset upper limit Pdset1 for the discharge pressure, the control signal calculation means 404 calculates the control current I to the solenoid 316 to maintain the discharge pressure Pd at the target discharge pressure Pdset2 lower than the upper limit Pdset1 for the discharge pressure. This prevents an abnormal increase of the discharge pressure Pd, thereby keeping the air conditioning system safe.

The present invention is not restricted to the above-described first embodiment but can be modified in various ways.

Figure 9:
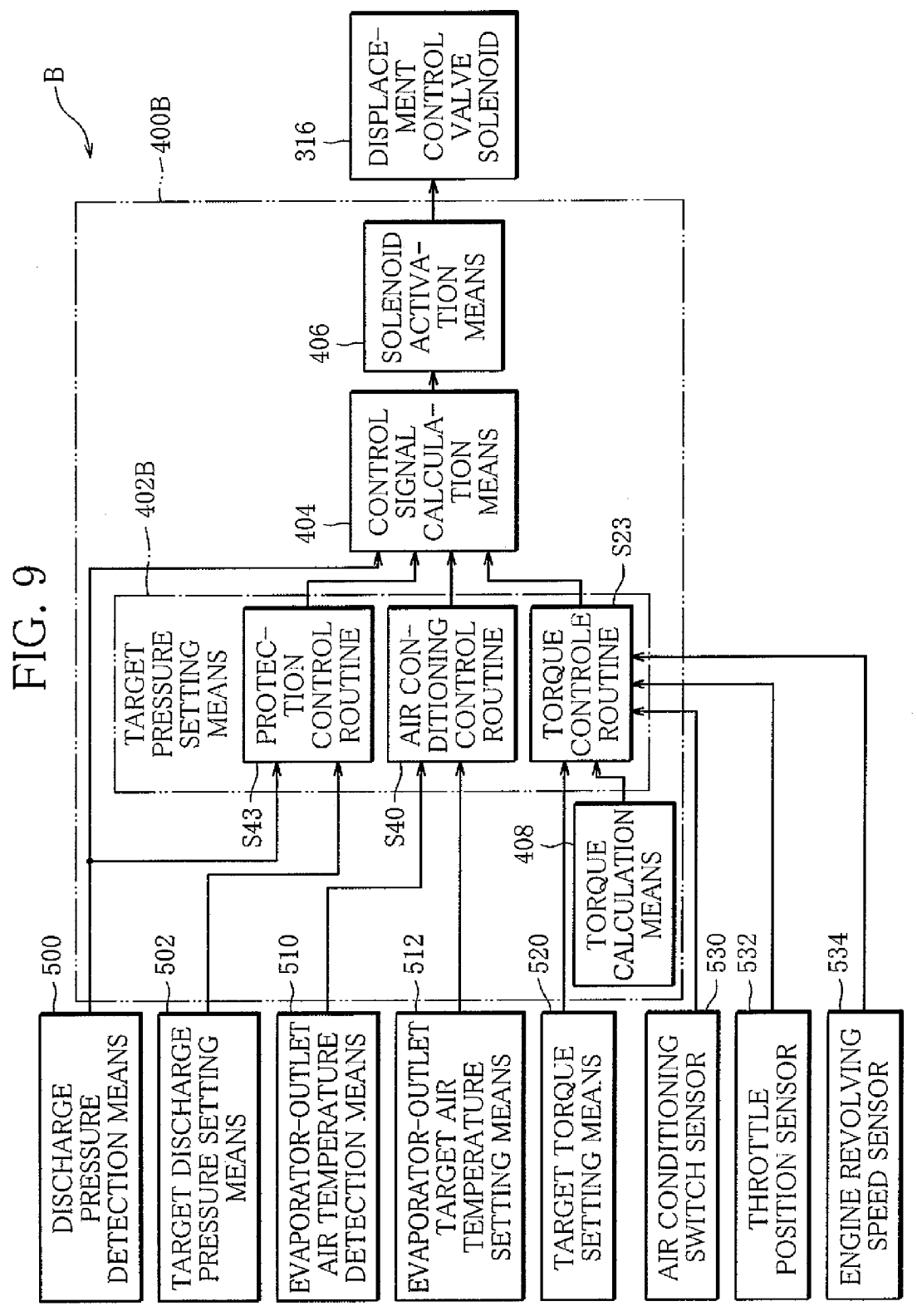

FIG. 9 shows a schematic configuration of a displacement control system B according to a second embodiment. The same elements as those of the first embodiment are assigned the same reference characters, while the description of such elements will be omitted.

The displacement control system B includes a torque calculation means 408 calculating (estimating) torque Tr on the operating compressor 100, or in other words, compressor 100 driving load, and a target torque setting means 520 for setting a target torque Trset, namely a target for the torque Tr on the compressor 100. The torque calculation means 408 and the target torque setting means 520 constitute an external information detection means delivering the torque Tr on the compressor 100 and the target torque Trset to a control device 400B as external information.

Incidentally, supplying the calculated torque Tr on the compressor 100 to an engine ECU enables regulation of load or power of the engine 114.

The torque calculation means 408 may constitute a part of the control device 400B, for example, or may be incorporated in an air conditioning ECU controlling the entire air conditioning system or an engine ECU controlling the operation of the engine 114. The target torque setting means 520 may constitute a part of the engine ECU, or may be incorporated in the control device 400B or the air conditioning ECU.

More specifically, the torque calculation means 408 can calculate the torque Tr on the basis of a difference between pressure of the refrigerant at a location in a high-pressure section of the refrigeration cycle 10 (high-pressure) and pressure of the refrigerant at a location in a low-pressure section of the refrigeration cycle 10 (low-pressure), or a difference between discharge pressure Pd and intake pressure Ps, or a difference between high-pressure and crank pressure Pc, or a difference between discharge pressure Pd and crank pressure Pc, or a physical quantity correlating with any of these differences. It is preferable that the torque calculation means 408 calculate the torque Tr on the basis of control current I which is a physical quantity correlating with the difference between the discharge pressure Pd and the intake pressure Ps, since it allows calculation of the torque Tr with a simpler configuration.

Here, the high-pressure section of the refrigeration cycle 10 means a section from the discharge chamber 142 to an inlet of the expansion device 16, and a discharge section means a section from the discharge chamber 142 to an inlet of the radiator 14. The low-pressure section of the refrigeration cycle 10, on the other hand, means a section from an outlet of the evaporator 18 to the intake chamber 140. It is to be noted that the high-pressure section and the discharge section include the cylinder bores 101a subjected to the compression process, while the low-pressure section includes the cylinder bores 101a subjected to the suction process.

The torque calculation means 408 may be replaced with a torque detection means directly detecting the torque Tr on the compressor 100.

The displacement control system B also includes an air conditioning (A/C) switch sensor 530 detecting whether a power-source switch of the air conditioning system (refrigeration cycle 10) is in "ON" position or "OFF" position, a throttle position sensor 532 detecting throttle opening degree, namely the degree to which a throttle of the vehicle is opened, and an engine speed sensor 534 detecting the revolving speed of the engine, which sensors also constitute the external information detection means.

It is to be noted that the external information detection means is not limited to any specific configuration. One or more selected from vehicle operating condition detection means, such as an evaporator-outlet air temperature detection means 510, an evaporator-outlet target air temperature setting means 512, the air conditioning switch sensor 530, the throttle position sensor 532, the engine speed sensor 534, etc., and compressor 100 operating condition detection means, such as the torque calculation means 408, etc., may be combined appropriately to constitute the external information detection means.

Next, the operation of the displacement control system B according to the second embodiment (how to use it) will be described.

Figure 10:
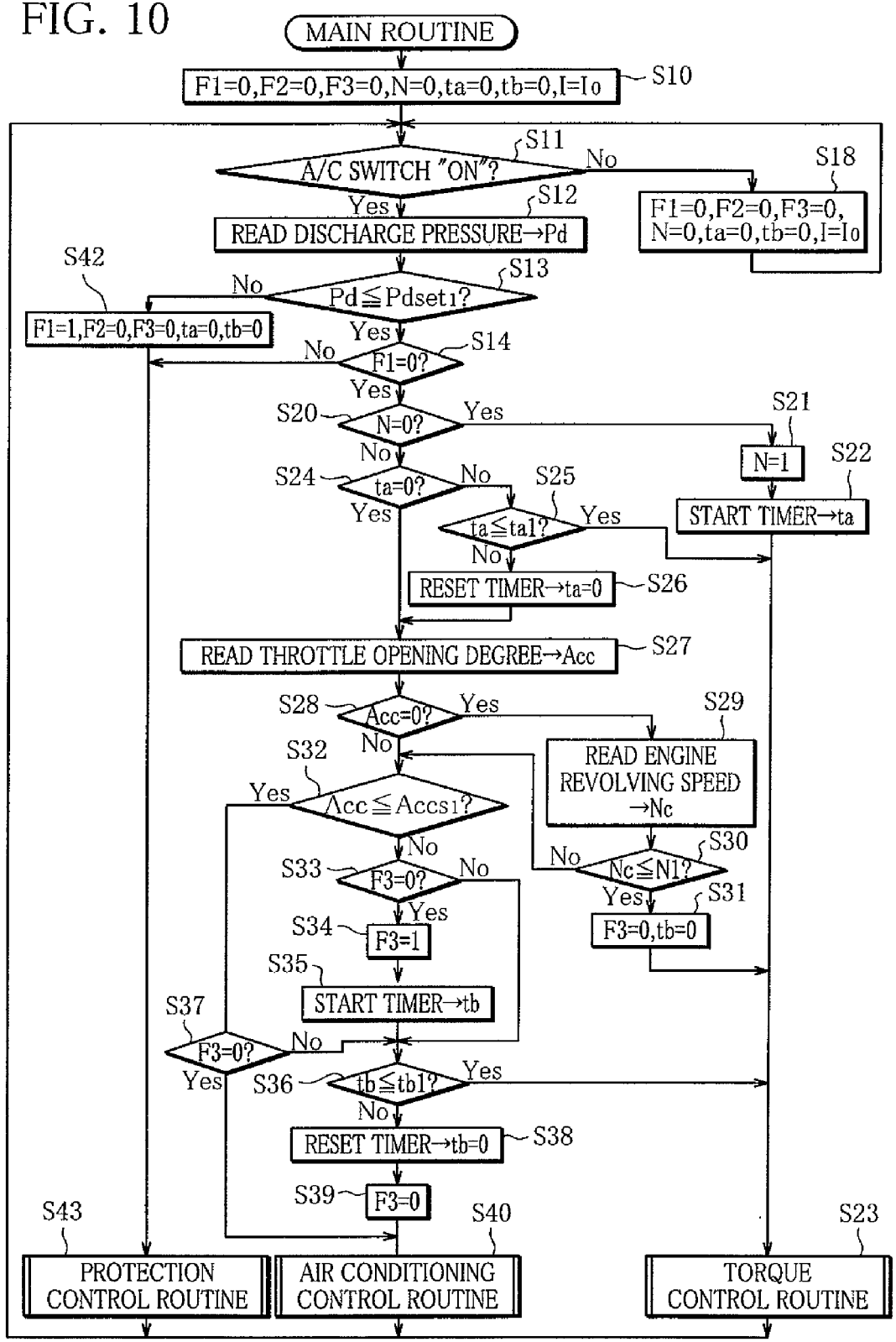
FIG. 10 is a control flow chart showing a main routine performed by the displacement control system of FIG. 9.

FIG. 10 is a flow chart showing a main routine performed by the control device 400B of the second embodiment.

In this main routine, first, initial conditions are set immediately after start (S10). Specifically, flags F1, F2, F3 and FN and elapsed times ta and tb are set to "0". The control current I to be supplied to the solenoid 316 of the displacement control valve 300 is set to a value $I_0$ resulting in a minimum displacement of the compressor 100.

Then, whether or not the air conditioning switch (A/C) of the automotive air conditioning system is in "ON" position is determined (S11). If the air conditioning switch is "ON" ("Yes"), discharger pressure Pd detected by the discharge pressure detection means 500 is read (S12).

Then the read discharge pressure Pd and a preset upper limit Pdset1 for the discharge pressure are compared (S13). If it is determined that the discharge pressure Pd is lower than or equal to the upper limit Pdset1 for it ("Yes"), whether or not the flag F1 is "0" is determined (S14).

Since the flag F1 is initially set to "0", the result of determination is "Yes". Thus, whether or not the flag N is "0" is determined next (S20). Since the flag N is initially set to "0", the result of determination is "Yes", thus the flag N is set to "1" (S21) and a timer is started to measure elapsed time ta (S22). Then, a torque control routine S23 is executed.

After executing the torque control routine S23, the flow of control returns to S11, and if the results of determination at S11, S13 and S14 are "Yes", goes to S20. At S20, the result of determination is "No" since the flag N was set to "1", and whether or not the elapsed time ta is "0" is determined (S24). Since the timer has been started at S22, the elapsed time ta is not "0", thus, the result of determination is "No".

Then, whether or not the elapsed time ta is less than or equal to a predetermined time ta1 is determined (S25). If the result of determination is "Yes", the torque control routine S23 is executed again. Thus, the torque control routine S23 is executed repeatedly in the period of the predetermined time ta1 after the air conditioning switch is put in "ON" position.

If the elapsed time ta exceeds the predetermined time ta1, thus, the result of determination at S25 is "No", or in other words, the timer has reached the value ta1, the timer is stopped and the elapsed time ta is set to "0" (S26), and the throttle opening degree Acc is read (S27). Then, whether or not the throttle opening degree Acc is "0" is determined (S28). If the result of determination is "Yes", the engine revolving speed Nc is read (S29).

Then, whether or not the engine revolving speed Nc is less than or equal to a predetermined revolving speed N1 is determined (S30), and if the result of determination is "Yes", the flag F3 and elapsed time tb are set to "0" (S31), and then the torque control routine S23 is executed. Since the revolving speed N1 is predetermined to be equal to or somewhat greater than an idling revolving speed, it is when the vehicle is in an idling state that the result of determination at S30 is "Yes". Thus, when the vehicle is in the idling state, the torque control routine S23 is executed.

If, on the other hand, the result of determination at S30 is "No", i.e., the vehicle is not in the idling state, whether or not the throttle opening degree Acc is less than or equal to a predetermined opening degree Accs1 is determined (S32). If the result of determination is "No", whether or not the flag F3 is "0" is determined (S33). If the result of determination at S33 is "Yes", the flag F3 is set to "1" (S34), and a timer is started to measure the elapsed time tb (S35).

After the timer is started at S35, whether or not the elapsed time tb is less than or equal to a predetermined time tb1 is determined (S36), and if the result of determination is "Yes", the torque control routine S23 is executed.

After the torque control routine S23 is executed, the determination at S32 is performed again after S11, etc. If the result of determination at S32 is "Yes", whether or not the flag F3 is "0" is determined (S37). Since the flag F3 has been previously set to "1" at S34, the result of determination at S37 is "No", so that the determination at S36 is performed again. Thus, the torque control routine S23 is executed repeatedly until the elapsed time tb exceeds the time tb1.

When the elapsed time tb exceeds the time tb1, thus the result of determination at S36 is "No", the timer is stopped and the elapsed time tb is set to "0" (S38) and the flag F3 is set to "0" (S39). Then, an air conditioning control routine S40 is executed. The air conditioning control routine S40 is executed also when the result of determination at S37 is "Yes".

If the result of determination at S33 is "No", steps S34 and S35 are skipped and S36 is performed.

If, on the other hand, the result of determination at S13 is "No", or in other words, the discharge pressure Pd exceeds the upper limit Pdset1 for it, the flag F1 is set to "1" and the flags F2, F3 and the elapsed times ta, tb are set to "0" (S42). Then, a protection control routine (protection control) S43 is executed.

Incidentally, when the air conditioning switch is put in "OFF" position, so that the result of determination at S11 is "No", the flags F1, F2, F3, N, the elapsed times ta, tb and the control current I are reset (S18).

As seen from the above, the displacement control system B according to the second embodiment can select and execute one of the air conditioning control routine S40, the torque control routine S23 and the protection control routine S43.

Of the three routines, the air conditioning control routine S40 is exactly the same as the intake pressure control routine S15 of the first embodiment, in which the target pressure setting means 402B sets the target Psset for the intake pressure to maintain the evaporator-output air temperature Teo at the target Tset for it (first setting mode). The description of the air conditioning control routine S40 will be therefore omitted.

Figure 11:
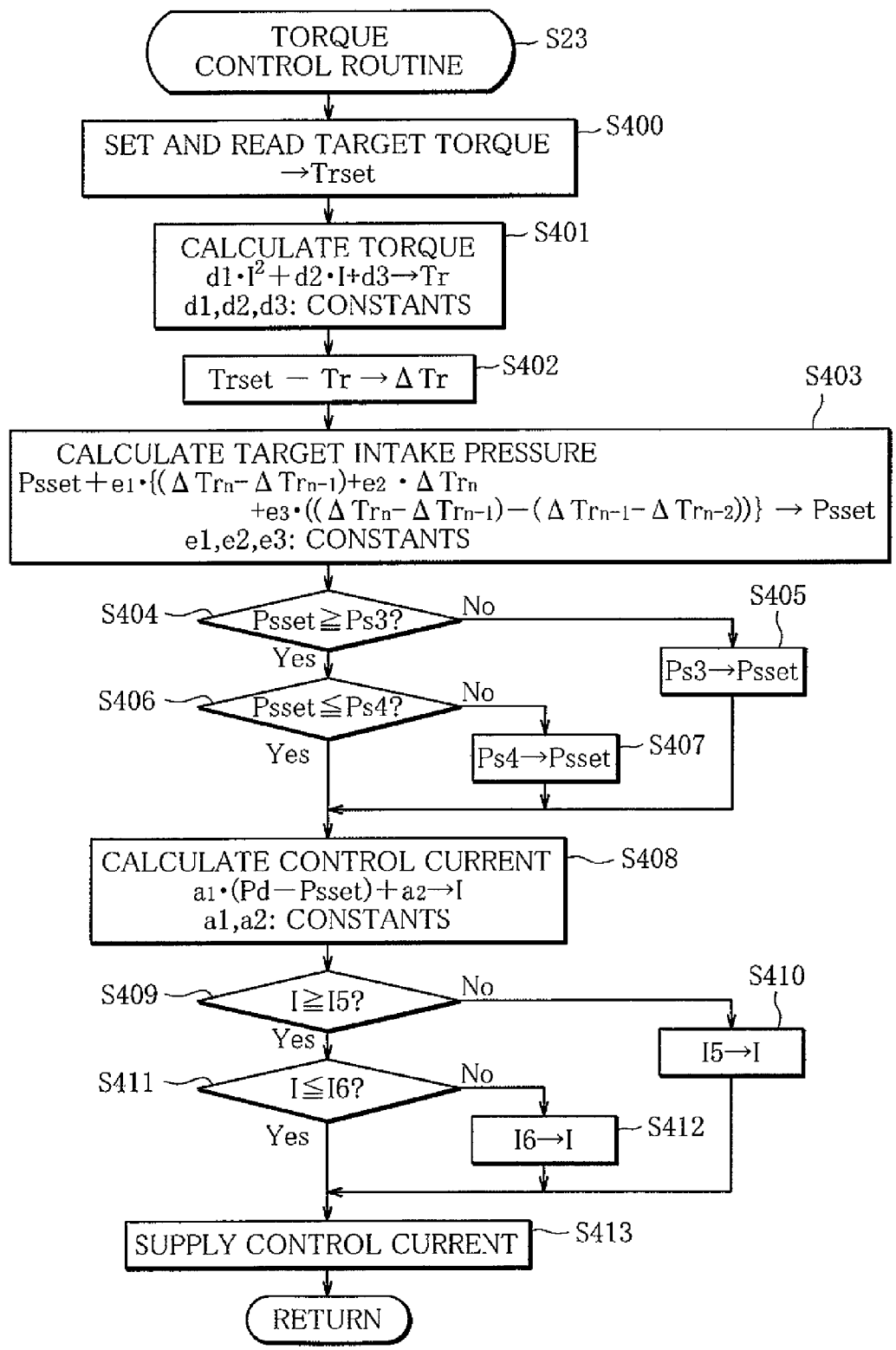
FIG. 11 is a control flow chart showing a torque control routine included in the main routine of FIG. 10.

As shown in FIG. 11, in the torque control routine S23, the target Trset for the torque set by the target torque setting means 520 is read (S400), and the torque calculation means 408 calculates the torque Tr, or in other words, the compressor 100 driving load (S401). The torque calculation means 408 calculates the torque Tr on the basis of the control current I which is a physical quantity correlating with the torque, for example. The arithmetic expression used is $Tr = d1 \cdot I^2 + d2 \cdot I + d3$, where d1, d2 and d3 are constants.

Calculating the torque Tr on the compressor 100 on the basis of the current supplied to the solenoid 316 allows accurate estimation of the torque Tr on the compressor 100, thus enables the torque Tr on the compressor 100 to be caused to properly approach the target Trset for it.

Then, a differential ΔTr between the target torque Trset and the calculated torque Tr is calculated (S402). Then, on the basis of the calculated differential ΔTr, a target Psset for the intake pressure is calculated using an arithmetic expression predetermined for PID control, for example (S403).

Then, the target intake pressure Psset calculated at S403 and a preset lower limit Ps3 are compared (S404). If the result of determination at S404 is "No", the lower limit Ps3 is read as a target intake pressure Psset (S405).

If, on the other hand, the result of determination at S404 is "Yes", the calculated target intake pressure Psset and a preset upper limit Ps4, which is greater than the lower limit Ps3, are compared (S406), and if the result of determination at S406 is "No", the upper limit Ps4 is read as a target intake pressure Psset (S407).

Thus, if the comparison at S404 and S406 finds Ps3≤Psset≤Ps4, the target intake pressure Psset calculated at S403 is read as a target intake pressure Psset.

Then, the control current I to be supplied to the solenoid 316 is calculated from the read target intake pressure Psset and the discharge pressure Pd detected by the discharge pressure detection means 500, using a predetermined arithmetic expression (S408). The control current I is obtained, for example by adding a constant a2 to the difference between the discharge pressure Pd and the target intake pressure Psset, multiplied by a proportional constant a1, as at S104 of the intake pressure control routine S15.

The control current I calculated at S408 is compared with a preset lower limit I5 (S409). If it is determined at S409 that the calculated control current I is less than the lower limit I5 ("No"), the lower limit I5 is read as a control current value I (S410), and control current of this value I is supplied to the solenoid 316 (S413).

If, on the other hand, it is determined at S409 that the calculated control current I is greater than or equal to the lower limit I5 ("Yes"), the calculated control current I is compared with a preset upper limit I6, which is greater than the lower limit I5 (S411). If it is determined at S411 that the calculated control current I exceeds the upper limit I6 ("No"), the upper limit I6 is read as a control current value I (S412), and control current I of this value is supplied to the solenoid 316 (S413).

Thus, if the comparison at S409 and S411 finds I5≤I≤I6, control current of the value I obtained at S408 is supplied to the solenoid 316 (S413).

In the above-described torque control routine S23, a differential ΔTr between the target torque Trset and the calculated torque Tr is calculated, the target intake pressure Psset is regulated on the basis of this differential ΔTr, and the displacement is controlled to maintain the torque Tr on the compressor 100 at the target torque Trset.

Thus, the torque control routine S23 is designed to regulate the torque Tr on the compressor 100 depending on the vehicle operating conditions, etc., thereby maintaining satisfactory vehicle running performance and stable engine control, while maintaining a certain level of air conditioning performance.

If, for example, the automotive air conditioning system is switched on or the vehicle is in an idling state or in an accelerating state, the displacement control system B can select and execute the torque control routine S23, where the target torque setting means 520 may set the target torque Trset differently, depending on the different vehicle states. Specifically, the target torque setting means 520 sets the target torque Trset in a switch-on mode or an idling mode or an acceleration mode (second setting mode).

Figure 12:
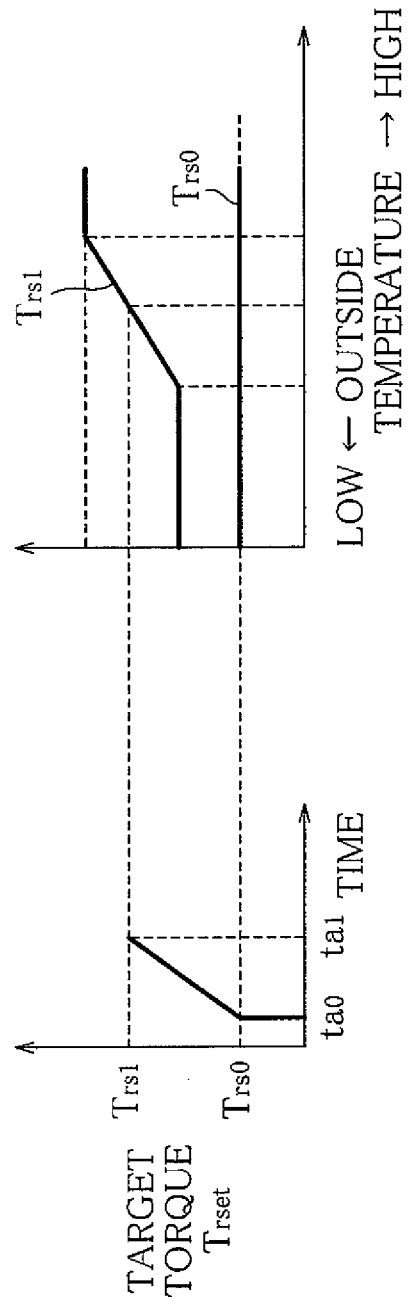
FIG. 12 is a diagram for explaining how the target torque, read in the torque control routine of FIG. 11, is set in a start mode.

More specifically, in the switch-on mode which is selected when the air conditioning system is switched on, the target toque Trset is set to a switch-on initial target torque Trs0 at the time that the air conditioning switch is put in "ON" position (t=ta0), and gradually increased to a post-switch-on target torque Trs1 with time, as shown in the left-hand diagram of FIG. 12.

It is to be noted that the post-switch-on target torque Trs1 is predetermined to be greater than the switch-on initial target torque Trs0, where the post-switch-on target torque Trs1 may be predetermined to be smaller at lower outside air temperature and greater at higher outside air temperature, as shown in the right-hand diagram of FIG. 12.

The arithmetic expression at S403 includes the target intake pressure Psset. In the switch-on mode, this target intake pressure Psset is initially set to, for example a value depending on the outside temperature Tamb, determined by the equation:

$$Psset = K1 \cdot Tamb + K2 \; (K1, K2 : \text{constants})$$

The switch-on mode, which regulates the torque Tr when the compressor 100 is activated, contributes to stable engine control.

Figure 13:
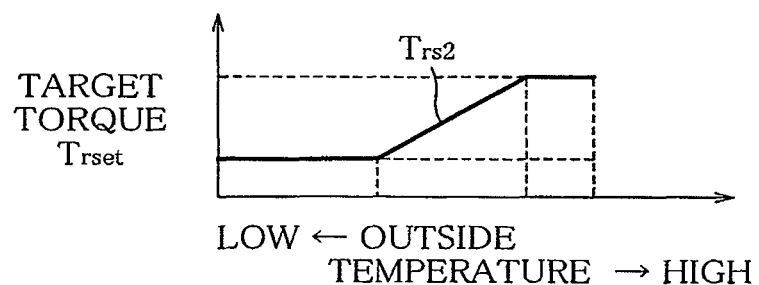
FIG. 13 is a diagram for explaining how the target torque, read in the torque control routine of FIG. 11, is set in an idling mode.

In the idling mode selected when the vehicle is in the idling state, the target torque Trset is set to an idling target torque Trs2. Also the idling target torque Trs2 may be predetermined to be smaller at lower outside air temperature and greater at higher outside air temperature, as shown in FIG. 13.

The idling mode contributes to stabilizing the engine revolving speed when the vehicle is in the idling state.

It is when the throttle opening degree Acc is determined to be "0" at S28 and the engine revolving speed Nc is determined to be lower than or equal to the predetermined engine revolving speed N1 at S30 that the vehicle is determined to be in the idling state. It may however be arranged such that also when the vehicle is traveling at low speed in a traffic jam, etc., it is determined that the vehicle is in the idling state.

Whether or not the vehicle is in the idling state may be determined by using a compressor 100 revolving speed sensor, a vehicle speed sensor, a vehicle halt signal sensor, a gear position sensor and/or the like in an appropriate combination, instead of or in addition to the throttle position sensor and the engine revolving speed sensor.

Figure 14:
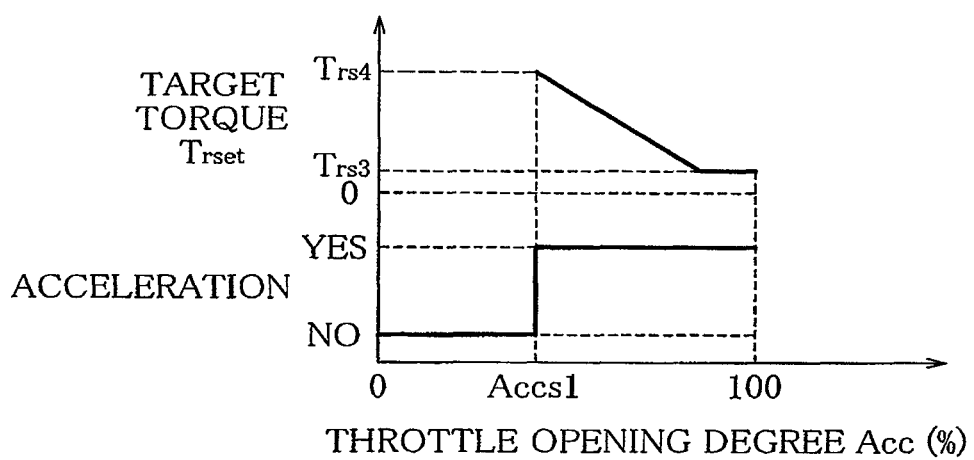
FIG. 14 is a diagram for explaining how the target torque, read in the torque control routine of FIG. 11, is set in an acceleration mode.

In the acceleration mode selected when the vehicle is in the accelerating state, the target torque Trset may be either fixed or varied depending on the throttle opening degree Acc as shown in FIG. 14. Specifically, the target torque Trset may be set to be between a first acceleration target torque Trs3 and a second acceleration target torque Trs4, where, in the range over a predetermined throttle opening degree Acc1, the target torque Trset may be set to be smaller for greater throttle opening degree Acc.

In FIG. 14, the vehicle is determined to be in the acceleration "Yes" state when the throttle opening degree Acc is greater than the predetermined opening degree Accs1, and in the acceleration "No" state when the throttle opening degree Acc is less than or equal to the predetermined opening degree Accs1. Once the vehicle is determined to be in the acceleration "Yes" state, the acceleration mode is maintained until the timer reaches the preset elapsed time at S36.

Such acceleration mode reduces the torque Tr on the compressor 100, thus the load on the engine 114 when the vehicle is in the accelerating state, to contribute to improving the vehicle acceleration performance. Further, maintaining the acceleration mode for the preset period of time tb1 after the acceleration is terminated greatly contributes to stable engine control.

It may be arranged such that the acceleration mode is selected when at least either of the throttle opening degree and the engine 114 revolving speed is greater than or equal to a predetermined value. Selecting the acceleration mode when the engine revolving speed exceeds a predetermined revolving speed can provide satisfactory vehicle high-speed performance.

Figure 15:
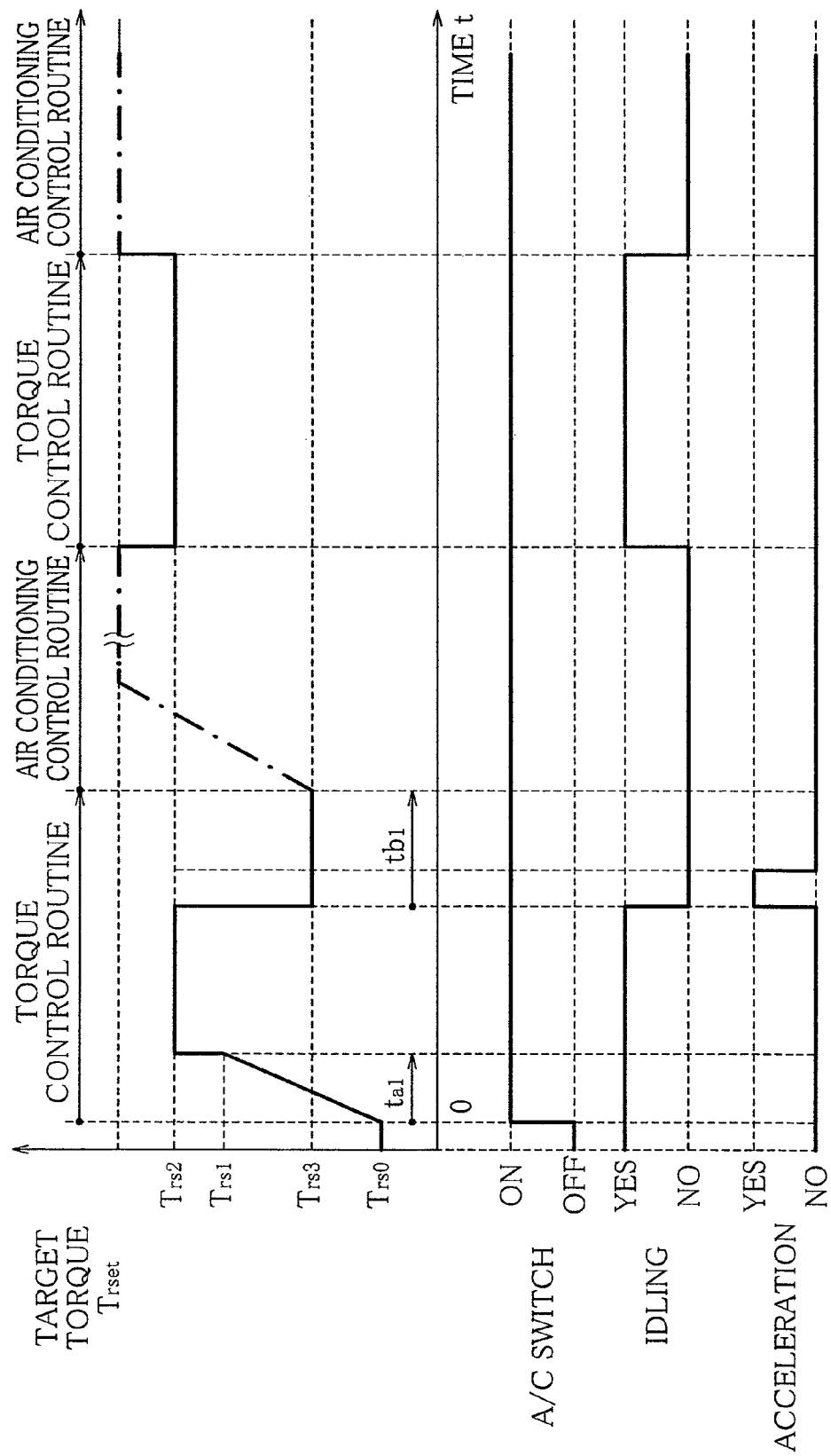
FIG. 15 is a diagram for explaining how the displacement control system according to the second embodiment operates in a certain period of time after start of a vehicle engine.

FIG. 15 is a diagram showing an example of how the target torque Trset is varied during a certain period of time after the air conditioning switch is put in "ON" position. When the air conditioning switch is put in "ON" position, the switch-on mode is selected to execute the torque control routine S23. Consequently, the target torque Trset is set to the switch-on initial target torque Trs0 and then gradually increased to the post-switch-on target torque Trs1 in the time ta1.

If, after the time ta1, the vehicle is determined to be in the idling state, the idling mode is selected to execute the torque control routine S23. Consequently, the target torque Trset is set to the idling target torque Trs2.

If the vehicle is accelerated from the idling state so that the throttle opening degree Acc exceeds the predetermined opening degree Accs1, the acceleration mode is selected to execute the torque control routine S23, and the target torque Trset is set to the first acceleration target torque Trs3.

Then the acceleration mode is maintained for the time tb1 even if the throttle opening degree Acc decreases to the predetermined opening degree Acc1 or below.

If, after the time tb1, the vehicle is determined to be traveling at constant speed, the air conditioning control routine S40 is executed. It is to be noted that in the air conditioning control routine S40, the target torque Trset is not set. Thus, in FIG. 15, the chain line roughly shows how the actual torque Tr on the compressor 100 varies. As the target Psset for the intake pressure is regularly regulated at S203 under PI control, the actual torque Tr gradually increases to an appropriate value and stays at that appropriate value.

Then, when the vehicle is parked, thus entering the idling state again, a switch from the air conditioning control routine S40 to the torque control routine takes place, and the idling mode is selected to execute the torque control routine S23. It is desirable that immediately before this switch, the target pressure setting means 402B store the target intake pressure Psset last set in the air conditioning control routine S40.

Then, if the vehicle slowly accelerates from the idling state and then shifts to constant-speed traveling, control according to the air conditioning control routine S40 is performed for the second time. In this second-time control according to the air conditioning control routine S40, it is desirable that at S203, the target Psset for the intake pressure be initially set to the target intake pressure Psset last set and stored in the air conditioning control routine S40. This allows the target Psset for the intake pressure to be set to an optimum value in a short time when the control according to the air conditioning routine S40 is performed again after interrupted, so that comfort is maintained in the vehicle interior.

As clear from the above, the target torque Trset, which serves as a target in the displacement control, can be set on the basis of the torque Tr, or in other words, the compressor 100 driving load or power, thus, the demand on the engine 114.

Figure 16:
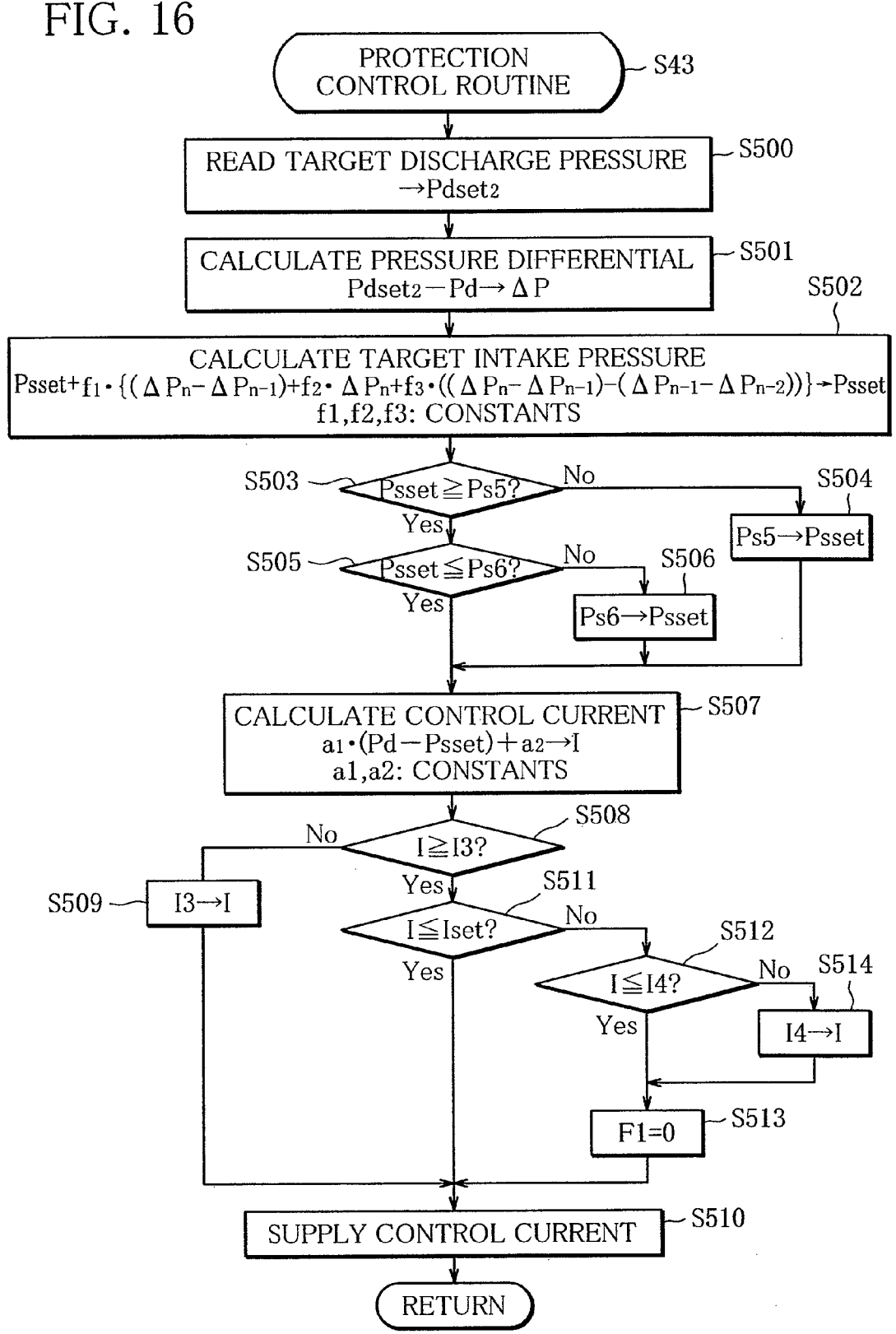
FIG. 16 is a control flow chart showing a protection control routine included in the main routine of FIG. 10.

The protection control routine S43 shown in FIG. 16 is an emergency control routine and having similarities to the discharge pressure control routine S17 of the first embodiment. Specifically, it is similar to the discharge pressure control routine S17 in that the target discharge pressure Pdset2 is read (S500) and that a differential ΔP between the target discharge pressure Pdset2 and the discharge pressure Pd is calculated (S501).

In the protection control routine S43, the target Psset for the intake pressure is set, or regulated on the basis of this differential ΔP, using an arithmetic expression predetermined for PID control, for example, instead of directly calculating the control current I on the basis of this differential ΔP (S502).

The differential ΔP is calculated at 5501 each time the protection control routine S43 is executed. In the arithmetic expression at 5502, the subscript n appended to the differential ΔP indicates that the differential ΔP has been calculated at S501 this time, the subscript n−1 indicates that the differential ΔP was calculated at 5501 last time, and the subscript n−2 indicates that the differential ΔP was calculated at S501 last time but one.

Then, the target intake pressure Psset regulated at S502 and a preset lower limit Ps5 is compared (S503). If the result of determination at 5503 is "No", the lower limit Ps5 is read as a target intake pressure Psset (S504).

If, on the other hand, the result of determination at 5503 is "Yes", the target intake pressure Psset is compared with a preset upper limit Ps6, which is greater than the lower limit Ps5 (S505), and if the result of determination at 5505 is "No", the upper limit Ps6 is read as a target intake pressure Psset (S506).

Thus, if the result of determination at S503 and S505 is Ps5≤Psset≤Ps6, the target intake pressure Psset calculated at 5502 is read as a target intake pressure Psset.

Then, the control current I to be supplied to the solenoid 316 is calculated from the read target intake pressure Psset and the discharge pressure Pd detected by the discharge pressure detection means 500, using a predetermined arithmetic expression (S507). For example, the control current I is obtained by adding a constant a2 to the difference between the discharge pressure Pd and the target intake pressure Psset, multiplied by a proportional constant a1, as at S104 of the intake pressure control routine S15.

Steps S508 to S514 after S507 are the same as steps S303 to S309 of the discharge pressure control routine S17.

As described above, when the discharge pressure Pd representing the high-pressure exceeds the upper limit Pdset1, execution priority is given to the protection control routine S43, so that the target intake pressure Psset is set to cause the discharge pressure Pd to approach the target discharge pressure Pdset2 (third setting mode). This prevents abnormal increase of the discharge pressure Pd, thereby keeping the air conditioning system safe.

By controlling the intake pressure Ps according to the target set by the target pressure setting means 402B in the third setting mode, the displacement is controlled to cause the discharge pressure Pd to approach the target discharge pressure Pdset2. The displacement control is optimized, for example by varying the target discharge pressure Pdset2 as necessary.

The displacement control system B of the variable displacement compressor according to the second embodiment, which controls the displacement by controlling the intake pressure Ps, has a plurality of setting modes. Thus, this displacement control system B can perform the displacement control in an optimum manner by selecting a setting mode depending on the operating conditions of the air conditioning system or the vehicle. Particularly, by controlling the intake pressure Ps according to the target set by the target pressure setting means 402B in the second setting mode, the displacement is controlled to cause the torque on the compressor 100 to approach the target Trset for it, thereby providing satisfactory vehicle running performance.

The present invention can be modified in various ways other than the second embodiment.

Although in the first and second embodiments, the discharge pressure Pd, namely the pressure of the refrigerant in the discharge chamber 142 is applied on the valve body 304 of the displacement control valve 300, the pressure (high-pressure) of the refrigerant at any location in the high-pressure section of the refrigeration cycle 10 may be applied in place of the discharge pressure Pd.

Further, although in the described embodiments, the intake pressure Ps, namely the pressure of the refrigerant in the intake chamber 140 is applied on the valve body 304 of the displacement control valve 300, the pressure (low-pressure)

of the refrigerant at any location in the low-pressure section of the refrigeration cycle 10 may be applied in place of the intake pressure Ps.

Only, it is preferable to incorporate the displacement valve 300 in the compressor 100 to simplify the configuration of the refrigeration cycle 10. Hence, normally, the discharge pressure Pd and the intake pressure Ps are applied on the valve body 304 of the displacement control valve 300.

In the first and second embodiments, the discharge pressure detection means 500 detects the pressure of the refrigerant at the inlet of the heat radiator 14 as the discharge pressure Pd. The discharge pressure detection means 500 however may detect the pressure (high-pressure) of the refrigerant at a location in the high-pressure section of the refrigeration cycle 10, in place of the discharge pressure Pd. In other words, the discharge pressure detection means 500 may be a high-pressure detection means. This allows the displacement control systems A, B to have great freedom of configuration.

In the displacement control systems A and B, the displacement is controlled properly by varying the target intake pressure Psset under PI control or PID control, even if there is a differential between the pressure detected by the discharge pressure detection means 500 and the pressure acting on the valve body 304 of the displacement control valve 300.

The discharge pressure detection means 500 may indirectly detect the discharge pressure Pd by detecting the high-pressure and calculating the discharge pressure on the basis of the detected high-pressure. For example, in the first and second embodiments, the pressure sensor 500a and the displacement control valve 300 are at different locations, resulting in a difference between the discharge pressure Pd detected by the pressure sensor 500a and the discharge pressure Pd acting on the valve body 304. To cope with this difference, the control current I may be calculated by using the discharge pressure Pd detected by the pressure sensor 500a and read, multiplied by a correction factor.

Further, the discharge pressure detection means 500 may detect the high-pressure indirectly. For example, the discharge pressure detection means 500 may include a temperature sensor 500b detecting the temperature of the refrigerant at a location in the high-pressure section and calculate the high-pressure on the basis of the refrigerant temperature in the high-pressure section. Such non-restricted configuration of the discharge pressure detection means 500 leads to increased freedom of configuration of the displacement control system.

Further, the discharge pressure detection means 500 may calculate the high-pressure on the basis of heat load on the refrigeration cycle 10, a physical quantity correlating with the compressor 100 revolving speed, voltage supplied to at least either of a fan assisting the radiator 14 and a fan assisting the vehicle's radiator, and vehicle speed.

In this case, the discharge pressure detection means 500 includes a heat load sensor detecting heat load, a revolving speed sensor detecting the physical quantity correlating with the compressor 100 revolving speed, a fan voltage sensor detecting the voltage supplied to at least either of the fan assisting the radiator 14 and the fan assisting the vehicle's radiator, and a vehicle speed sensor detecting the vehicle speed. Such indirect detection of the high-pressure leads to increased freedom of configuration of the air conditioning system.

Incidentally, the physical quantity correlating with the compressor 100 revolving speed should be taken to include the compressor 100 revolving speed itself.

Alternatively, the discharge pressure detection means 500 may indirectly detect the high-pressure on the basis of heat load on the refrigeration cycle 10, a physical quantity correlating with the compressor 100 revolving speed, voltage supplied to at least either of a fan assisting the radiator 14 and a fan assisting the vehicle's radiator, vehicle speed, and a target for pressure set by the target pressure setting means 402A, B. Also in this case, indirect detection of the high-pressure leads to increased freedom of configuration of the air conditioning system.

Although in the first and second embodiments, the target pressure setting means 402A, B sets a target Ps for the intake pressure Ps, it may set a target for the pressure (low-pressure) of the refrigerant at any location in the low-pressure section of the refrigeration cycle 10. Like this, this displacement control system A, B provides great freedom of configuration.

Desirably, the discharge pressure detection means 500 should detect the pressure of the refrigerant at a location in the discharge section of the refrigeration cycle 10, and more desirably, should detect the pressure of the refrigerant in the discharge chamber 142 directly or indirectly, whereas the target pressure setting means 402A, B should desirably set a target for the pressure of the refrigerant in the intake chamber 140. This allows the control current I supplied to the solenoid 316 to be regulated accurately on the basis of the discharge pressure Pd and intake pressure Ps actually acting on the valve body 304 of the displacement control valve 300, not affected by the pressure of the refrigerant differing by location in the high-pressure section, and therefore leads to improved accuracy of intake pressure Ps control.

Although in the first and second embodiments, the compressor 100 is a clutchless compressor, it may be a variable displacement compressor provided with an electromagnetic clutch. Further, the compressor 100 exemplified as a swash plate reciprocating compressor may be a wobble-plate reciprocating compressor, a variable displacement rotary-vane or scroll compressor, or a hermetic compressor with an electric motor incorporated.

Only, the variable-displacement swash plate or wobble-plate reciprocating compressor can have a very small minimum piston stroke determined by a minimum inclination of a swash plate or a wobble plate, and therefore provide a wide range of variation of displacement. This allows the displacement control system A, B to fully enjoy the benefit of the widened range of control of the intake pressure Ps.

Although in the target intake pressure setting routine S103 in the first embodiment and the air conditioning control routine S40 in the second embodiment, the target intake pressure Psset is calculated on the basis of a differential ΔT between the evaporator-outlet target air temperature Tset set by the evaporator-outlet target air temperature setting means 512 and the evaporator-outlet actual air temperature Teo detected by the evaporator-outlet air temperature detection means 510, using a predetermined arithmetic expression, the method of setting the target intake pressure Psset is not restricted to this.

Figure 17:
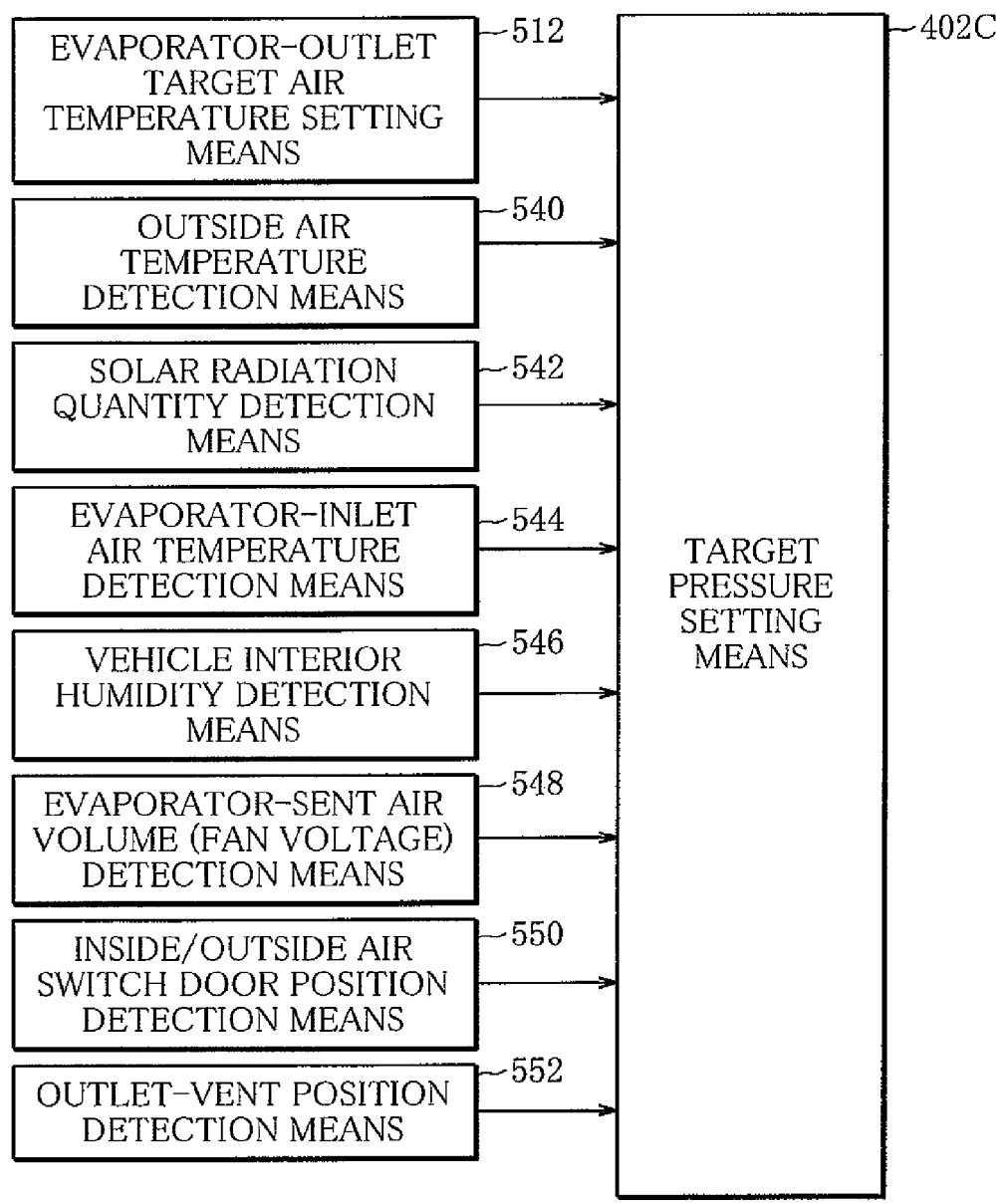
FIG. 17 is a block diagram showing a variant of the external information detection means and target pressure setting means.

For example, as shown in FIG. 17, it may be arranged such that one or more means for detecting one or more heat load conditions (heat load detection means) are provided to constitute the external information means, in place of the evaporator-outlet air temperature detection means 510, and that a target pressure setting means 402C sets a target Psset for the intake pressure on the basis of the outputs of the heat load detection means. Preparing a map defining the relationship between the heat load conditions, the evaporator-outlet air temperature Teo and the target intake pressure Psset, and an arithmetic expression using the defined relationship allows the target pressure setting means 402C to set a target Psset for the intake pressure without being fed back with the evaporator-outlet air temperature Teo. On the basis of the set target Psset for the intake pressure, the displacement is properly controlled to maintain the evaporator-outlet air temperature Teo at the evaporator-outlet target air temperature Tset.

Figure 18:
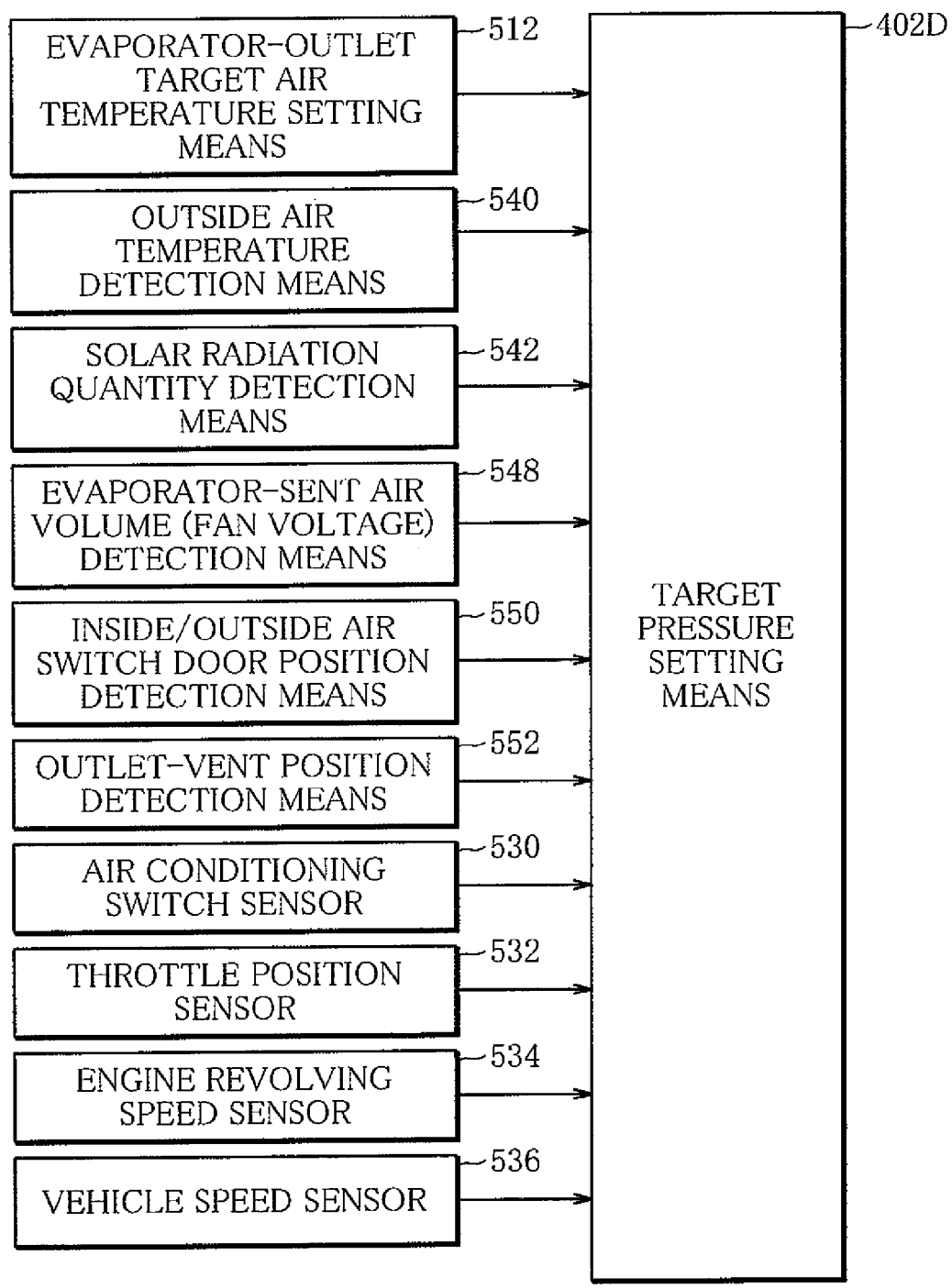
FIG. 18 is a block diagram showing another variant of the external information detection means and target pressure setting means.

Further, as shown in FIG. 18, it may be arranged such that the external information means includes the evaporator-outlet target air temperature setting means 512 and the heat load detection means and at least either of a vehicle operating condition detection means and a compressor operating condition detection means, and that a target pressure setting means 402D sets a target Psset for the intake pressure on the basis of the outputs of the heat load detection means and at least either of the vehicle operating condition detection means and the compressor operating condition detection means.

Also in this case, preparing a map defining the relationship between the heat load conditions, the vehicle operating conditions, the evaporator-outlet air temperature Teo and the target intake pressure Psset, and an arithmetic expression using the defined relationship allows the target pressure setting means 402D to set a target Psset for the intake pressure on the basis of the heat load conditions and the vehicle operating conditions, without being fed back with the evaporator-outlet air temperature Teo. On the basis of the set target Psset for the intake pressure, the displacement is properly controlled to maintain the evaporator-outlet air temperature Teo at the evaporator-outlet target air temperature Tset.

Such use of the heat load detection means and at least either of the vehicle operating condition detection means and the compressor operating condition detection means eliminates the need to detect the degree to which the evaporator 18 is cooled, for example in the form of the evaporator-outlet air temperature, thereby allowing simplification of the displacement control system.

Specifically, the heat load condition detection means may be one or more selected from an outside air temperature detection means 540, an outside humidity detection means, a means detecting the pressure or temperature of the refrigerant at a location in the high-pressure section or the low-pressure section of the refrigeration cycle 10, a solar radiation quantity detection means 542, an evaporator-inlet air temperature detection means 544, vehicle interior temperature detection means detecting temperature at different locations in the vehicle interior, vehicle interior surface temperature detection means detecting surface temperature at different parts in the vehicle interior, vehicle interior humidity detection means 546 detecting humidity at different locations in the vehicle interior, an evaporator-sent air volume (fan voltage) detection means 548, an inside/outside air switch door position detection means 550, an outlet-vent position detection means 552, an air-mixing door position detection means, etc.

The compressor operating condition detection means may be one or more selected from the compressor 100 revolving speed sensor, the discharge pressure detection means, the intake pressure detection means, compressor 100 temperature detection means for detecting temperature at different parts of the compressor 100, a compressor 100 oscillation detection means, etc.

The vehicle operating condition detection means may be one or more selected from the throttle position sensor 532, the engine revolving speed sensor 534, the vehicle speed sensor 536 detecting the vehicle traveling speed, an accelerator-pedal depression sensor, a gear position detection means, an engine load detection means, a brake pedal depression detection means, a radiator coolant temperature detection means, an engine oil temperature detection means, etc.

When the heat load detection means is used, arranging to execute the torque control routine S23 when the heat load exceeds a predetermined value can prevent great heat load from leading to excessively large torque Tr on the compressor 100, and thus, maintain reliability of the compressor 100.

Further, arranging to execute the torque control routine S23 when at least either of the throttle opening degree Acc and the engine revolving speed Nc exceeds a predetermined value and the heat load on the refrigeration cycle 10 is greater than or equal to a predetermined value, thus imposing stricter conditions to execute the torque control routine S23 allows reduction in torque by taking the second setting mode S23 only when necessary, while maintaining as high air conditioning performance as possible.

Although in the second embodiment, whether to switch from the air conditioning control routine S40 to the torque control routine S23 is determined only in the main routine, the switch may be made on the basis of other conditions. For example, another condition may be added to be considered in determining whether to execute the torque control routine S23, such that the torque control routine S23 is executed only when the control current I estimated to be supplied at S413 of the torque control routine S23 is less than the control current I supplied at S107 of the air conditioning routine S40. This allows good use of the merit of regulating the torque Tr on the compressor 100 by executing the torque control routine S23.

Further, although in the second embodiment, the torque control routine S23 is executed only on the basis of information related to the vehicle operation, it may be arranged to execute the torque control routine S23 when the heat load on the refrigeration cycle 10 is greater than or equal to a predetermined value. Alternatively, it may be arranged to execute the torque control routine S23 on the basis of both the information related to the vehicle operation and the heat load on the refrigeration cycle 10.

In the first and second embodiments, it is not absolutely necessary for the control device A, B to execute the emergency control or protection control routine. It is however preferable that the control device be able to perform emergency control to protect the compressor 100. Further, it may be arranged such that the control device 400A, B be able to selectively perform control in normal control mode or conventional Pd-Ps control in which control current I is determined to keep constant the pressure difference between the discharge pressure Pd and the intake pressure Ps.

In the first and second embodiments, the lower limits Ps1 and upper limits Ps2, Ps4 for the target intake pressure Psset may be varied depending on the output of the heat load detection means, the vehicle operating condition detection means or the compressor operating condition detection means. Varying the lower limit Ps1 and upper limit Ps2 on the basis of the external information results in the target intake pressure Psset set to be suited for the external information.

The lower limits I1, I3, I5 and upper limits I2, I4, I6 for the control current I may be varied depending on the outputs of the heat load detection means and the operating condition detection means.

In the first and second embodiments, the lower limits I1, I3, I5 for the control current I may be the same in value. Likewise, the upper limits I2, I4, I6 may be the same in value. The lower limits I1, I3, I5 may be determined by substituting Pd−Ps=0 into the aforementioned equation (2), for example. Regulation of the control current I with the lower limits thus set allows the differential Pd-Ps to be controlled up to a level close to zero (corresponding to the minimum displacement).

The lower limits Ps1, Ps3, Ps5 for the intake pressure Ps may be the same in value. Likewise, the upper limits Ps2, Ps4, Ps6 for the intake pressure Ps may be the same in value.

Further, the upper limit Pdset1 for the discharge pressure, which is a criterion to determine whether to shift to the discharge pressure control routine S17, and the target discharge pressure Pdset2 in the discharge pressure control routine S17 may be varied depending on the outputs of the heat load detection means and the operation condition detection means.

The arithmetic expressions used in the first and second embodiments are not restricted to the aforementioned examples. For example, the expression giving the control current in the intake pressure control routine S15 of FIG. 5 (at S104) may be a·Pd−b·Psset+c (a, b and c are constants), or a non-linear equation including a term (Pd−Psset)$''$.

At S203 of the target intake pressure setting routine S103 in FIG. 6, any expression may be used, as long as it gives a target intake pressure Psset causing the evaporator-outlet air temperature Teo to approach the target Tset for the evaporator-outlet air temperature.

At S302 of the discharge pressure control routine S17 in FIG. 7, any expression may be used, as long as it gives a control current I causing the discharge pressure Pd to approach the target discharge pressure Pdset2.

The expression at S401 in FIG. 11 may further include a variable(s), such as compressor 100 revolving speed and/or heat load condition(s).

At S403 of the second control routine S23 in FIG. 11, any expression may be used, as long as it gives a target intake pressure Psset causing the torque Tr to approach the target torque Prset.

Although in the first and second embodiments, the current supplied to the solenoid 316 by the solenoid activation means 406 is detected, it is not absolutely necessary to detect the current supplied to the solenoid 316 by the solenoid activation means 406. Instead, the control signal calculation means 404 may directly calculate the duty ratio of a displacement control signal so that the solenoid activation means supplies current to the solenoid 316 according to the duty ratio calculated by the control signal calculation means 404.

In the first and second embodiments, the control device A, B is composed of an ECU, which ECU may be integrated with an air conditioning ECU or an engine ECU.

Figure 19:
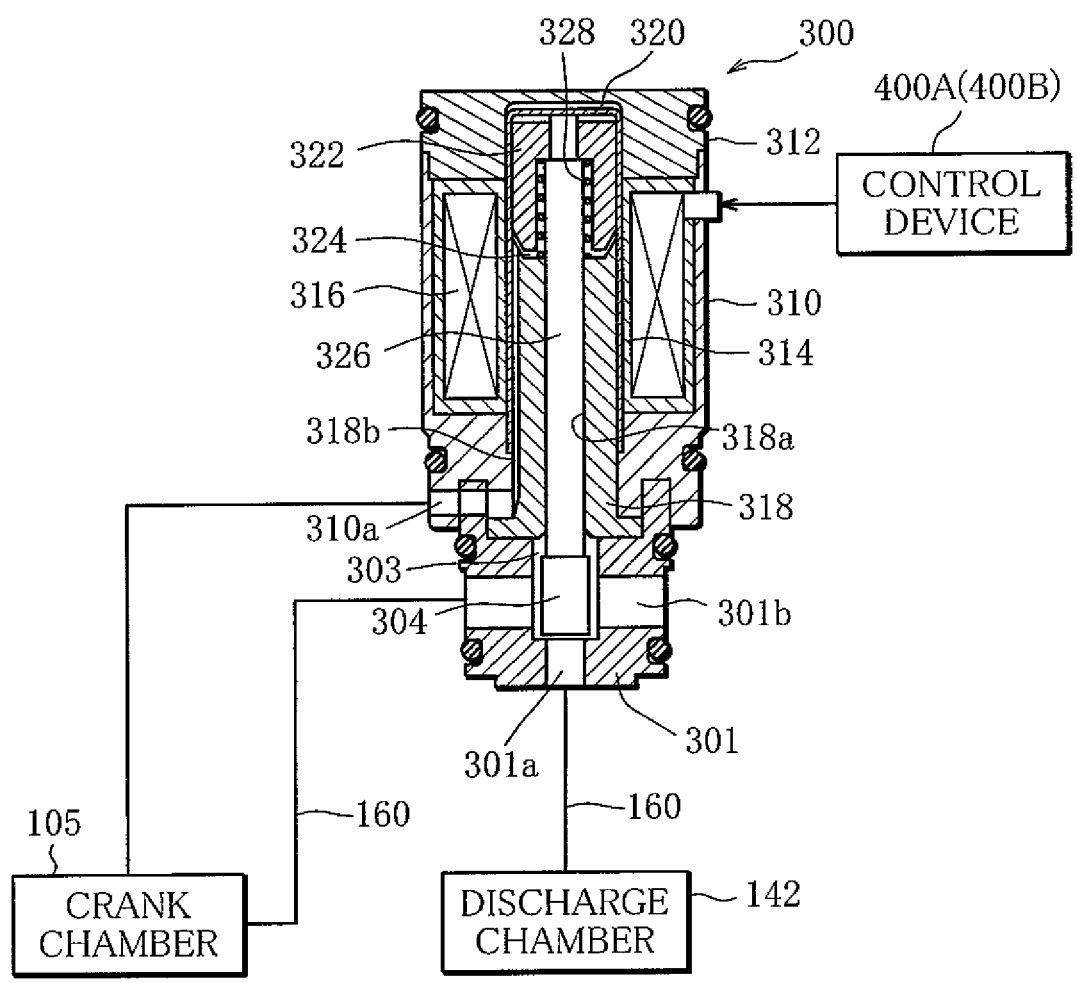
FIG. 19 is a diagram for explaining a variant of how to connect the displacement control valve to the variable displacement compressor of FIG. 1.

Although in the first and second embodiments, the pressure-sensing port 310a of the displacement control valve 300 is connected to the intake chamber 140 so that the discharge pressure Ps prevails in the movable-core holding space 324, the pressure-sending port 310a may be connected to the crank chamber 105 as shown in FIG. 19. In other words, the displacement may be controlled to maintain the crank pressure Pc at a target Pcset for the crank pressure.

In this case, the crank pressure Pc acts on the valve body 304, and the target pressure setting means 402A, B of the control device 400A, B sets a target for the crank pressure Pc (target crank pressure Pcset) in place of a target Psset for the intake pressure. The control signal calculation means 404 of the control device A, B calculates the control current I on the basis of a difference between the discharge pressure Pd and the target crank pressure Pcset.

Here, the crank pressure Pc serves as a control pressure varying the displacement of the compressor 100, and the present invention can regulate the control current I supplied to the solenoid 316 of the displacement control valve 300 on the basis of the high-pressure and the target for either the low-pressure or the control pressure.

Although in the first and second embodiments, a plate with a fixed orifice 103c is arranged in the gas release passage 162 to raise the crank pressure Pc by restricting the flow rate in gas release passage 162, the fixed-orifice 103c plate may be replaced by a constriction capable of varying the flow rate, or a valve whose opening degree is regulated.

Although in the described embodiments, the intake pressure Ps or the crank pressure Pc acts on the valve body 304 of the displacement control valve 300 in the direction opposite to the discharge pressure Pd, it may be arranged such that the crank pressure Pc additionally acts when the discharge pressure Pd and the intake pressure Ps act in the opposite directions, or the intake pressure Ps additionally acts when the crank pressure Pd and the intake pressure Ps act in the opposite directions. Further, the displacement control valve 300 may be constructed to include a bellows, a diaphragm or the like so that the discharge pressure Pd and the intake pressure Ps or the crank pressure Pc act on the opposite sides of the bellows, the diaphragm or the like.

Figure 20:
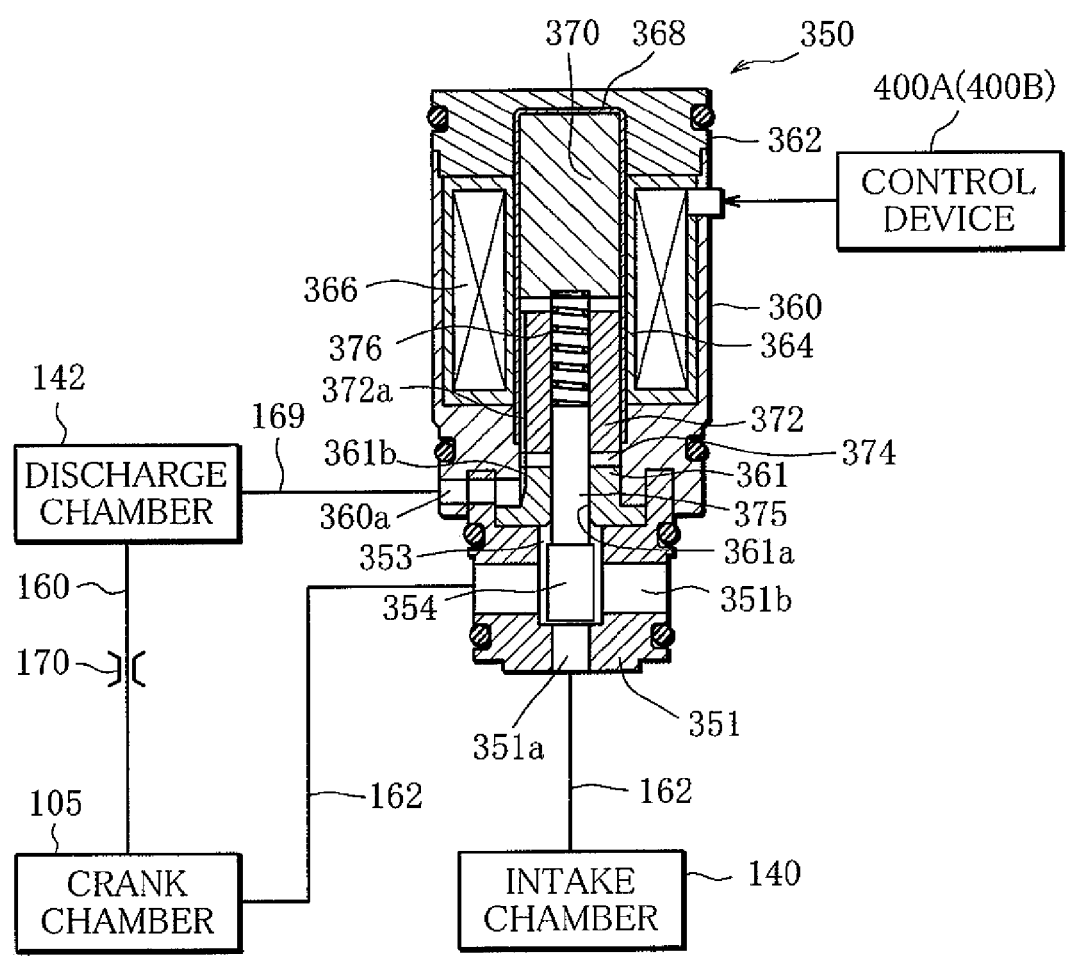
FIG. 20 is a diagram for explaining another variant of how to connect the displacement control valve to the variable displacement compressor of FIG. 1 is connected.

Further, although in the described embodiments, the displacement control valve 300 is incorporated in the gas supply passage 160 connecting the discharge chamber 142 and the crank chamber 105, a displacement control valve 350 may be incorporated in the gas release passage 162 connecting the crank chamber 105 and the intake chamber 140, as shown in FIG. 20, in place of the displacement control valve 300. In other words, outlet control controlling the flow passage area in the gas release passage 162 may be performed in place of inlet control controlling the flow passage area in the gas supply passage 160.

Specifically, also the displacement control valve 350 consists of a valve unit and a drive unit opening and closing the valve unit. The valve unit includes a cylindrical valve housing 351, and the valve housing 351 has an outlet port 351a at a first end. The outlet port 351a is connected to the intake chamber 140 by a downstream side of the gas release passage 162, and communicates with a valve chamber 353 defined inside the valve housing 351.

A columnar valve body 354 is fitted within the valve chamber 353. Within the valve chamber 353, the valve body 354 can move along the axis of the valve housing 351, and can close the outlet port 351a by coming in contact with the end face of the valve housing 351. The end face of the valve housing 351 thus functions as a valve seat.

The valve housing 351 has an inlet port 351b in its cylindrical wall, and the inlet port 351a is connected to the crank chamber 105 by an upstream side of the gas release passage 162. Also the inlet port 351b communicates with the valve chamber 353. Thus, the crank chamber 105 can become connected to the intake chamber 140 via the intake port 351b, the valve chamber 353 and the outlet port 351a.

The drive unit includes a cylindrical solenoid housing 360. The solenoid housing 360 is coaxially joined to the second end of the valve housing 351 opposite to the aforementioned first end. A flanged cylindrical separation member 361 is arranged at a valve-unit side open end of the solenoid housing 360. The separation member 361 has an insertion hole 361a through the center, and the insertion hole 361a communicates with the valve chamber 353 at a first end.

The open end of the solenoid housing 360 opposite to the separation member 361 is closed with an end cap 362. A solenoid 366 consisting of a coil of wire wound on a bobbin 364 is enclosed in the solenoid housing 360.

A sleeve 368 is arranged to extend inside the solenoid housing 360 and into the end cap 362, with its closed end to the end cap 362 side. The sleeve 368 extends through the solenoid 366. An approximately columnar fixed core 370 is fixed inside the sleeve 368, to its closed end side. A core holding space 374 for holding a cylindrical movable core 372 is defined between the fixed core 370 and the separation member 361. The insertion hole 361a communicates with the core containing space 374 at the second end opposite to the aforementioned first end.

A solenoid rod 375 is slidably fitted in the insertion hole 361a, and the valve body 354 is integrally and coaxially joined to a first end of the solenoid rod 375. The opposite, second end portion of the solenoid rod 375 projects into the core holding space 374 from the separation member 361 side, and is integrally fitted in the movable core 372. A spring 376 is set between the second end of the solenoid rod 375 and the end face of the fixed core 370 to close the valve. A specified clearance is provided between the movable core 372 and the fixed core 370.

The movable core 372, the fixed core 370, the solenoid housing 360 and the end cap 362 are each made of a magnetic material, and constitute a magnetic circuit. The sleeve 368 is made of a stainless-based nonmagnetic material.

The solenoid housing 360 has a pressure sensing port 360a, and the pressure sensing port 360a is connected to the discharge chamber 142 by a sensing passage 169. Axially-extending pressure-sensing grooves 361b, 372a are formed in the outer cylindrical surfaces of the separation member 361 and the movable core 372, respectively, and the pressure sensing port 360a and the pressure sensing grooves 361b, 372a communicate with each other. Thus, the discharge chamber 142 and the movable core holding space 374 are connected via the pressure sensing port 360a and the pressure sensing grooves 361b, 372a, and the discharge pressure Pd acts on the rear side of the valve body 354 in the valve-closing direction.

A control device 400A or 400B provided outside the compressor 100 is connected to the solenoid 366. When a control current I is supplied from the control device 400A (400B), the solenoid 366 generates magnetic force F(I). The magnetic force F(I) generated by the solenoid 366 attracts the movable core 372 toward the fixed core 370, thus acts on the valve body 354 in the valve opening direction. Thus, in the displacement control valve 350, the force fs exerted by the spring 376 acts in the same direction as the discharge pressure Ps, as equations (3), (4) below show:

$$-Sv \cdot (Pd - Ps) - fs + F(I) = 0 \tag{3}$$

$$Ps = -\frac{1}{Sv} \cdot F(I) + Pd + \frac{fs}{Sv} \tag{4}$$

Incidentally, in the outlet control, the gas supply passage 160 is provided to connect the discharge chamber 142 directly to the crank chamber 105, where a constriction 170 is provided in the gas supply passage 160.

In the above-described first and second embodiments, the refrigerant used is not restricted to R134a or carbon dioxide. The air conditioning system can use another new refrigerant. In the displacement control valve 300, even when the carbon dioxide is used as a refrigerant, smaller sealing surface area Sv provides a wider range of control of the target intake pressure Psset.

The displacement control system of the variable displacement compressor according to the first or second embodiment can be applied to the refrigeration cycle providing not only cooling but also warming. In this case, during cooling, normal control maintaining the target intake pressure Psset (or target crank pressure Pcset) is performed. During warming, on the other hand, the displacement of the variable displacement compressor can be controlled by regulating the control current I to the solenoid 316 to maintain the discharge pressure Pd detected by the discharge pressure detection means 500 at the target Psset2 for the discharge pressure.

Last, the displacement control system of the variable displacement compressor according to the present invention is applicable to the refrigeration cycle in general, including the refrigeration cycle of an indoor air conditioning system other than the automotive air conditioning system, the refrigeration cycle of a freezing apparatus such as a refrigerator-freezer, etc.

The invention claimed is:

1. A displacement control system of a variable displacement compressor provided in a circulation line along which a refrigerant circulates, together with a radiator, an expansion device and an evaporator to constitute a refrigeration cycle of an air conditioning system, and designed such that variation in control pressure causes variation in displacement, comprising:
 a displacement control valve including a valve body configured to open and close a valve hole by receiving high-pressure in a first direction, at least either of low-pressure and said control pressure in a second direction opposite to the first direction, and electromagnetic force generated by a solenoid, where the high-pressure is the pressure of the refrigerant at a location in a high-pressure section of the refrigeration cycle and the low-pressure is the pressure of the refrigerant at a location in a low-pressure section of the refrigeration cycle, the displacement control valve being capable of regulating the displacement of the variable displacement compressor by varying said control pressure by opening and closing the valve hole;
 a high-pressure detection means for detecting said high-pressure;
 an external information detection means for detecting external information about the refrigeration cycle;
 a target pressure setting means for setting a target for said low-pressure or said control pressure based on the external information detected by said external information detection means; and
 a current regulation means for regulating current supplied to the solenoid of the displacement control valve in one or more regulation modes, where in a first regulation mode, the current regulation means regulates the current supplied to the solenoid of the displacement control valve based on a difference between the high-pressure detected by the high-pressure detection means and the target for pressure set by the target pressure setting means,
 wherein the target pressure setting means is configured to set the target for pressure in one or more setting modes, and
 wherein said one or more setting modes include a first setting mode to set a target for temperature of air immediately after passing across the evaporator, and set said target for pressure to cause the temperature of air immediately after passing across the evaporator to approach said target for temperature.

2. The displacement control system of the variable displacement compressor according to claim 1, wherein
 the high-pressure section comprises a section from a discharge chamber of the variable displacement compressor to the expansion device, and
 the low-pressure section comprises a section from the expansion device to an intake chamber of the variable displacement compressor.

3. The displacement control system of the variable displacement compressor according to claim 2, wherein the high-pressure detection means includes a pressure detection means for detecting the pressure of the refrigerant at a location in the high-pressure section.

4. The displacement control system of the variable displacement compressor according to claim 2, wherein the high-pressure detection means includes a temperature detection means for detecting the temperature of the refrigerant at a location in the high-pressure section.

5. The displacement control system of the variable displacement compressor according to claim 3, wherein the high-pressure detection means directly or indirectly detects the pressure of the refrigerant in the discharge chamber of the variable displacement compressor as said high-pressure, and the target for pressure set by the target pressure setting means is a target for the pressure of the refrigerant in the intake chamber of the variable displacement compressor.

6. The displacement control system of the variable displacement compressor according to claim 1, wherein
the external information detection means includes an evaporator-outlet air temperature detection means for measuring the temperature of air immediately after passing across the evaporator, and
in said first setting mode, the target pressure setting means sets said target for pressure to cause the temperature of air immediately after passing across the evaporator, detected by said evaporator-outlet air temperature detection means to approach said target for temperature.

7. The displacement control system of the variable displacement compressor according to claim 1, wherein
the external information detection means includes a heat load detection means for detecting heat load on the refrigeration cycle, and
in said first setting mode, the target pressure setting means sets said target for pressure based on the heat load detected by the heat load detection means, to cause the temperature of air immediately after passing across the evaporator to approach said target for temperature.

8. The displacement control system of the variable displacement compressor according to claim 1, wherein
the air conditioning system is applied to a vehicle,
the external information detection means includes a heat load detection means for detecting heat load on the refrigeration cycle, and an operating condition detection means for detecting operating conditions of at least either of the variable displacement compressor and the vehicle, and
in said first setting mode, the target pressure setting means sets said target for pressure based on the heat load on the refrigeration cycle detected by the heat load detection means and the operating conditions of at least either of the variable displacement compressor and the vehicle detected by the operating condition detection means.

9. The displacement control system of the variable displacement compressor according to claim 1, wherein said one or more setting modes further include a second setting mode to set a target for variable-displacement-compressor driving load, and set said target for pressure to cause the variable-displacement-compressor driving load to approach said target for driving load.

10. The displacement control system of the variable displacement compressor according to claim 1, wherein said one or more setting modes further include a third setting mode to set a target for said high-pressure, and set said target for pressure to cause the high-pressure detected by the high-pressure detection means to approach said target for high-pressure.

11. The displacement control system of the variable displacement compressor according to claim 10, wherein when the high-pressure detected by the high-pressure detection means exceeds an upper limit, the target pressure setting means takes the third setting mode, giving it priority over the first and second setting modes.

12. The displacement control system of the variable displacement compressor according to claim 9, further comprising a driving load calculation means for calculating the variable-displacement-compressor driving load, wherein
in said second setting mode, the target pressure setting means sets said target for pressure to cause the driving load calculated by the driving load calculation means to approach the target for driving load.

13. The displacement control system of the variable displacement compressor according to claim 12, wherein the driving load calculation means calculates the variable-displacement-compressor driving load based on a difference between said high-pressure and said low-pressure or a difference between said high-pressure and said control pressure or a physical quantity correlating with one of these differences.

14. The displacement control system of the variable displacement compressor according to claim 13, wherein the driving load calculation means calculates the variable-displacement-compressor driving load based on the current supplied to the solenoid as said physical quantity.

15. The displacement control system of the variable displacement compressor according to claim 9, wherein the target pressure setting means takes the second setting mode, when any of one or more execution conditions is met, where
one of said one or more execution conditions is that the air conditioning system is switched on.

16. The displacement control system of the variable displacement compressor according to claim 15, wherein the second setting mode is maintained for a predetermined period of time after the target pressure setting means takes the second setting mode.

17. The displacement control system of the variable displacement compressor according to claim 9, wherein the air conditioning system is applied to a vehicle, and
the target pressure setting means takes the second setting mode, when any of one or more execution conditions is met, where
one of said one or more execution conditions includes a limitation relating to the operating conditions of the vehicle.

18. The displacement control system of the variable displacement compressor according to claim 17, wherein one of said one or more execution conditions is that the vehicle is in an idling state.

19. The displacement control system of the variable displacement compressor according to claim 17, wherein one of said one or more execution conditions includes a limitation that at least either of throttle opening degree and engine revolving speed is greater than or equal to a predetermined value.

20. The displacement control system of the variable displacement compressor according to claim 9, wherein the target pressure setting means takes the second setting mode, when any of one or more execution conditions is met, where
one of said one or more execution conditions includes a limitation that the heat load on the refrigeration cycle is greater than or equal to a predetermined value.

21. The displacement control system of the variable displacement compressor according to claim 9, wherein the target pressure setting means takes the second setting mode, when any of one or more execution conditions is met, where one of said one or more execution conditions includes a limitation that at least either of throttle opening degree and engine revolving speed exceeds a predetermined value and the heat load on the refrigeration cycle is greater than or equal to a predetermined value.

22. The displacement control system of the variable displacement compressor according to claim 19, wherein one of said one or more execution conditions includes a limitation that the current now being supplied to the solenoid in the first setting mode is greater than the current estimated to be supplied to the solenoid in the second setting mode.

23. The displacement control system of the variable displacement compressor according to claim 9, wherein
the current regulation supply means stores the target for pressure immediately before a shift from the first setting mode to the second setting mode, and
when a shift from the second setting mode back to the first setting mode takes place, the current regulation supply means regulates the current supplied to the solenoid based on the stored target for pressure.

24. The displacement control system of the variable displacement compressor according to claim 1, wherein
the target pressure setting means sets the target for pressure in one or more setting modes, where
said one or more setting modes include a second setting mode designed to set a target for variable-displacement-compressor driving load, and set said target for pressure to cause the variable-displacement-compressor driving load to approach said target for driving load.

25. The displacement control system of the variable displacement compressor according to claim 1, wherein
the target pressure setting means sets the target for pressure in one or more setting modes, where
said one or more setting modes include a third setting mode designed to set a target for said high-pressure, and set said target for pressure to cause the high-pressure detected by the high-pressure detection means to approach said target for high-pressure.

26. The displacement control system of the variable displacement compressor according to claim 1, wherein
the variable displacement compressor includes
a housing defining a discharge chamber, a crank chamber, an intake chamber and cylinder bores,
pistons fitted in respective cylinder bores,
a drive shaft rotatably supported inside the housing,
a conversion mechanism including a swash plate variable in inclination to convert rotation of the drive shaft into reciprocating motion of the pistons,
a gas supply passage connecting the discharge chamber and the crank chamber, and
a gas release passage connecting the crank chamber and the intake chamber,
wherein the displacement control valve is incorporated in either of the gas supply passage and the gas release passage.

27. The displacement control system of the variable displacement compressor according to claim 1, wherein the target pressure setting means sets said target for pressure between preset upper and lower limits.

28. The displacement control system of the variable displacement compressor according to claim 27, wherein said upper and lower limits are varied based on external information detected by the external information detection means.

29. The displacement control system of the variable displacement compressor according to claim 1, wherein when the high-pressure detected by the high-pressure detection means exceeds a preset upper limit for the high-pressure, said current regulation means takes a second regulation mode, giving it priority over said first regulation mode, and in the second regulation mode, sets a target for the high-pressure and regulates the current supplied to the solenoid to cause the high-pressure detected by the high-pressure detection means to approach said target for high-pressure.

30. The displacement control system of the variable displacement compressor according to claim 1, wherein the refrigerant is carbon dioxide.

* * * * *